(12) United States Patent
Kim et al.

(10) Patent No.: US 10,384,652 B2
(45) Date of Patent: Aug. 20, 2019

(54) DEVICE FOR CONNECTING WIPER BLADE TO WIPER ARM

(71) Applicant: ADM21 CO., LTD., Cheongyang-eup (KR)

(72) Inventors: Kyung Su Kim, Cheongyang-eup (KR); Kyung Jong Nam, Cheongyang-eup (KR); Sang Woo Kim, Cheongyang-eup (KR)

(73) Assignee: ADM21 CO., LTD., Cheongyang-Eup (KR)

( * ) Notice: Subject to any disclaimer, the term of this patent is extended or adjusted under 35 U.S.C. 154(b) by 147 days.

(21) Appl. No.: 15/482,634

(22) Filed: Apr. 7, 2017

(65) Prior Publication Data

US 2018/0236979 A1    Aug. 23, 2018

(30) Foreign Application Priority Data

Feb. 22, 2017   (KR) .................. 10-2017-0023318

(51) Int. Cl.
*B60S 1/38*   (2006.01)
*B60S 1/40*   (2006.01)

(52) U.S. Cl.
CPC ............ *B60S 1/381* (2013.01); *B60S 1/3849* (2013.01); *B60S 1/3851* (2013.01); *B60S 1/3863* (2013.01); *B60S 1/3868* (2013.01); *B60S 1/4003* (2013.01); *B60S 1/3858* (2013.01); *B60S 1/3881* (2013.01); *B60S 1/407* (2013.01); *B60S 1/4074* (2013.01); *B60S 2001/4022* (2013.01); *B60S 2001/4051* (2013.01)

(58) Field of Classification Search
CPC ...... B60S 1/3881; B60S 1/381; B60S 1/3848; B60S 1/3849; B60S 1/3851; B60S 1/3856; B60S 1/3858; B60S 1/3868; B60S 1/4003; B60S 1/4006; B60S 1/4009; B60S 1/4038; B60S 1/4045; B60S 1/4048; B60S 1/4067; B60S 1/4077; B60S 2001/4051; B60S 2001/4035; B60S 2001/4058
USPC .................. 15/250.32, 250.43, 250.201
See application file for complete search history.

(56) References Cited

U.S. PATENT DOCUMENTS

| | | | |
|---|---|---|---|
| 6,061,280 A | 5/2000 | Aritome | |
| 6,251,078 B1 | 6/2001 | Moore et al. | |
| 6,332,871 B1 | 12/2001 | Douglas et al. | |
| 6,634,055 B1* | 10/2003 | De Block | B60S 1/3858 |
| | | | 15/250.32 |
| 6,799,348 B1* | 10/2004 | Swanepoel | B60S 1/38 |
| | | | 15/250.32 |
| 9,604,597 B2* | 3/2017 | Bex | B60S 1/3851 |
| 2008/0028565 A1 | 2/2008 | Thienard | |
| 2013/0067677 A1 | 3/2013 | Ehde | |

(Continued)

FOREIGN PATENT DOCUMENTS

| | | |
|---|---|---|
| EP | 1 833 708 B1 | 10/2011 |
| EP | 2 150 444 B1 | 2/2016 |

(Continued)

*Primary Examiner* — Gary K. Graham
(74) *Attorney, Agent, or Firm* — Seed IP Law Group LLP

(57) ABSTRACT

Disclosed herein is a device for connecting a wiper blade to a wiper arm in which diversity and convenience of the use may be secured by selectively connecting several types of wiper arms using one adapter and in which a structure may be simplified and coupling strength may be increased using fitting and sliding assembling structures.

22 Claims, 20 Drawing Sheets

(56) References Cited

U.S. PATENT DOCUMENTS

| | | |
|---|---|---|
| 2013/0067678 A1 | 3/2013 | Ehde |
| 2013/0139343 A1* | 6/2013 | Kim .................. B60S 1/381 15/250.32 |
| 2013/0152330 A1* | 6/2013 | Kim .................. B60S 1/381 15/250.201 |
| 2013/0212827 A1 | 8/2013 | Coughlin |
| 2013/0212828 A1 | 8/2013 | Coughlin |
| 2013/0298347 A1 | 11/2013 | Verboven |
| 2013/0333144 A1 | 12/2013 | Depondt |
| 2014/0082876 A1 | 3/2014 | Avasiloaie et al. |
| 2014/0130282 A1 | 5/2014 | Avasiloaie et al. |
| 2014/0165321 A1 | 6/2014 | Depondt |
| 2014/0182075 A1 | 7/2014 | Polocoser et al. |
| 2014/0259507 A1 | 9/2014 | Caillot et al. |
| 2014/0338143 A1 | 11/2014 | Bousset et al. |
| 2014/0352097 A1 | 12/2014 | Cox et al. |
| 2014/0359963 A1* | 12/2014 | An .................. B60S 1/381 15/250.201 |
| 2015/0013093 A1 | 1/2015 | Polocoser et al. |
| 2015/0082577 A1 | 3/2015 | Depondt |
| 2015/0135465 A1 | 5/2015 | Depondt |
| 2015/0166017 A1 | 6/2015 | Young, III et al. |
| 2015/0175132 A1* | 6/2015 | Benner .................. B60S 1/381 15/250.201 |
| 2015/0191155 A1 | 7/2015 | Depondt |
| 2015/0210251 A1 | 7/2015 | Oslizlo et al. |
| 2015/0274132 A1 | 10/2015 | Polocoser et al. |
| 2015/0274133 A1 | 10/2015 | Polocoser et al. |
| 2015/0329087 A1 | 11/2015 | Young, III et al. |
| 2016/0107615 A1 | 4/2016 | Young, III et al. |
| 2016/0107616 A1 | 4/2016 | Young, III et al. |
| 2016/0159324 A1 | 6/2016 | Polocoser et al. |

FOREIGN PATENT DOCUMENTS

| | | |
|---|---|---|
| KR | 10-0692369 B1 | 3/2007 |
| KR | 10-2011-0000855 A | 1/2011 |
| KR | 10-2011-0112794 A | 10/2011 |

* cited by examiner

SECTION A-A'

SECTION D-D'

SECTION E-E'

SECTION F-F'

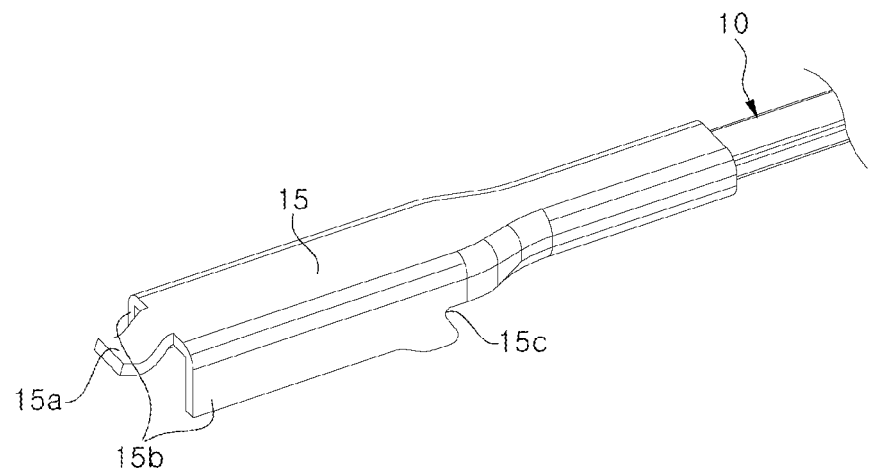
*Fig. 30*
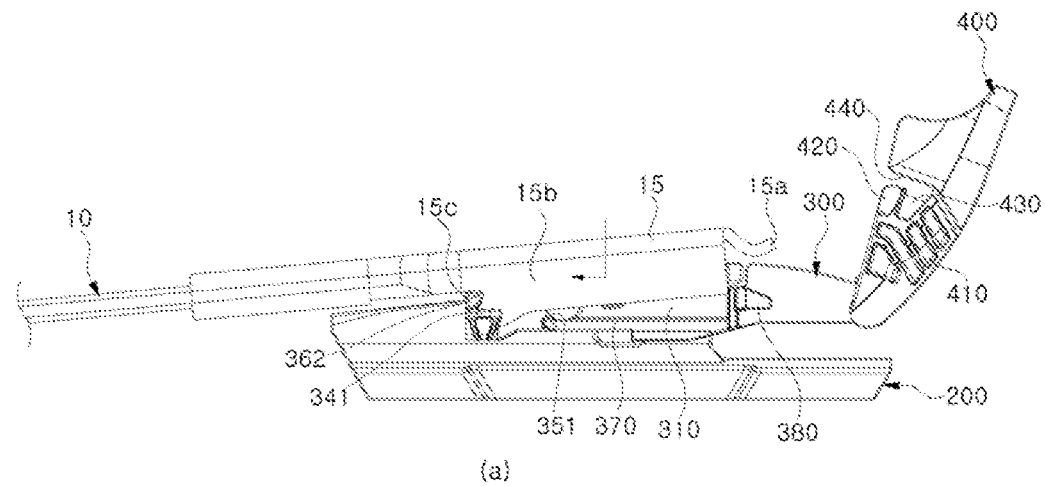
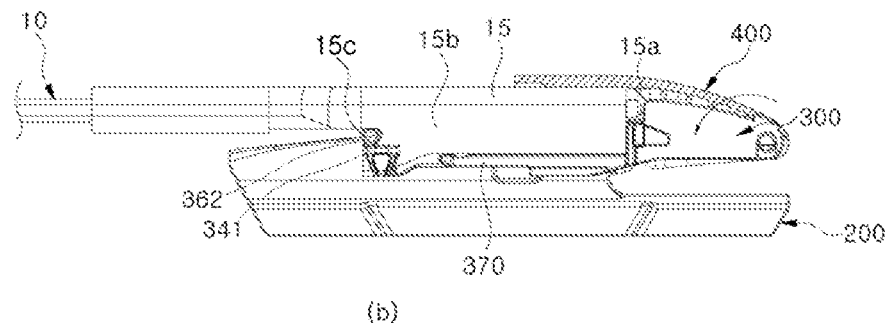
*Figs. 31A and 31B*

DEVICE FOR CONNECTING WIPER BLADE TO WIPER ARM

CROSS-REFERENCE TO RELATED APPLICATIONS

This application claims priority from and the benefit of Korean Patent Application No. 10-2017-0023318, filed on Feb. 22, 2017, which is hereby incorporated by reference for all purposes as if fully set forth herein.

BACKGROUND

Technical Field

The present disclosure relates to a device for connecting a wiper blade to a wiper arm, and more particularly, a device for connecting a wiper blade to a wiper arm in which diversity and convenience of the use may be secured by selectively connecting several types of wiper arms using one adapter and in which a structure may be simplified and coupling strength may be increased using fitting and sliding assembling structures.

Description of the Related Art

Generally, a vehicle is installed with a wiper device for wiping a surface of a windshield. Such a wiper device includes a driving motor, a wiper arm, a blade positioned on the surface of the windshield, and the like.

Here, the driving motor provides a torque in a state in which it is installed in the vehicle, and the wiper arm wipes the surface of the windshield while reciprocating by the torque of the driving motor.

The blade includes a strip, made of rubber or the like, contacting the surface of the windshield, a frame fixing and supporting the strip in a length direction, a spoiler covering an upper surface of the frame, and the like.

The frame may be formed of an assembly having a plurality of levers, and recently, a blade using a frame having a thin and long bar shape has been used.

Such a blade has been known as a flat wiper blade or a flat bar wiper blade in the related art.

In the flat wiper blade, an entire height of the wiper device may be lowered and the strip may contact the surface of the windshield with a uniform load.

In addition, the flat wiper blade is coupled to the wiper arm by installing a connection device at a central portion of the frame and directly coupling a distal end portion of the wiper arm to the connection device.

Here, various types of wiper arms have been put on the market depending on manufacturers, and various types of devices connecting a wiper blade to a wiper arm have been put on the market so as to correspond to different types of wiper arms.

However, since the device connecting a wiper blade to a wiper arm according to the related art does not have a structure for selectively connecting various types of wiper arms, but is used for only a specific type of wiper arm, a use range of the device connecting a wiper blade to a wiper arm according to the related art was very restrictive.

Therefore, a structure of the device for connecting a wiper blade to a wiper arm capable of selectively coupling several types of wiper arms is required.

In addition, in the device for connecting a wiper blade to a wiper arm according to the related art, a structure for coupling the frame of the wiper blade to the wiper arm is complicated, which causes an increase in a manufacturing cost and an assembling time, and there is a risk that a gap (a lifting phenomenon, or the like) will occur at a coupling portion between the frame and the wiper arm at the time of driving the vehicle at a high speed, such that it is difficult to secure reliability of the device.

As the related art document related to the present disclosure, there is Korean Patent No. 10-0692369 (registered on Mar. 2, 2007). In Korean Patent No. 10-0692369, a wiper arm connector of a wiper connection device has been disclosed.

BRIEF SUMMARY

An object of the present disclosure is to provide a device for connecting a wiper blade to a wiper arm in which several types of wiper arms can be selectively connected using one adapter, thereby making it possible to secure diversity and convenience of the use.

Another object of the present disclosure is to provide a device for connecting a wiper blade to a wiper arm in which a frame of the wiper blade, and a bracket and spoilers are coupled to each other using a fitting coupling structure and a slide coupling structure, such that a structure may be simplified, thereby making it possible to reduce a manufacturing cost, and a coupled state between the frame and the bracket is not changed even when a vehicle is driven at a high speed, such that reliability of the device may be improved.

Still another object of the present disclosure is to provide a device for connecting a wiper blade to a wiper arm in which spoilers and a frame are slid and coupled to each other in a direction perpendicular to an operation direction of the wiper blade, such that an assembling process is easily performed, thereby making it possible to improve productivity.

Yet still another object of the present disclosure is to provide a device for connecting a wiper blade to a wiper arm in which a gap is not formed at coupled portions between spoilers and strip, such that a flow of air may be smoothly maintained, thereby making it possible to prevent the wiper blade from being floated.

According to an exemplary embodiment of the present disclosure, a device for connecting a wiper blade to a wiper arm includes: a bracket having the wiper blade coupled to a lower portion thereof, the wiper blade having a length in front and rear directions; and an adapter coupled to an upper portion of the bracket to be thus coupled to the wiper arm, wherein the wiper blade includes a frame having a slit formed in the front and rear directions so as to vertically penetrate therethrough and cut grooves each formed at left and right ends thereof, a strip coupled through a lower portion of the slit, and a first spoiler and a second spoiler coupled to an upper portion of the frame and each coupled to upper ends of the frame in the front and rear directions, the bracket includes a frame seating groove concavely formed in a lower surface of the bracket so that the frame is inserted thereinto and having a length in the front and rear directions, a first spoiler seating groove concavely formed in front of the frame seating groove so that one end of the first spoiler is inserted thereinto and having first upper catching protrusions protruding on left and right wall surfaces thereof, and a second spoiler seating groove concavely formed behind the frame seating groove so that one end of the second spoiler is inserted thereinto and having second upper catching protrusions protruding on left and right wall surfaces thereof, and first lower catching grooves are concavely formed at left and right ends of one end of the first spoiler so that the first upper catching protrusions are correspondingly inserted thereinto, and second lower catching grooves are concavely formed at left and right ends of one end of the second spoiler so that the second upper catching protrusions are correspondingly inserted thereinto.

Left and right wall surfaces of the frame seating groove may include: position protrusions correspondingly inserted in to the cut grooves, and support protrusions each disposed in the front and rear directions of the frame seating groove on the basis of the position protrusions and supporting both ends of the frame in the front and rear directions, respectively, below the frame.

Curved surface parts convex upward may be formed at upper ends of the support protrusions, and the curved surface parts may be formed in the front and rear directions of the frame seating groove and are closely adhered to a lower end of the frame.

The frame may have a shape bent downward along both ends in the front and rear directions on the basis of the cut grooves, and a linear part of which both ends in the front and rear directions are supported on upper ends of the support protrusions and an upper end is closely adhered to and horizontally disposed on an upper surface of the frame seating groove may be formed at the center of the frame.

The strip may include: a body having a length in the front and rear directions and having an upper end closely adhered to a lower surface of the frame, a head part having a length in the front and rear directions at the upper end of the body and inserted through the slit to have a lower end closely adhered to the upper end of the frame, and a lip part having a length in the front and rear directions in a lower end of the body and having a lower end protruding downward of the first spoiler and the second spoiler.

An insertion hole for inserting one end of the head part through a lower portion thereof and then sliding and coupling the head part in an opposite direction may be formed in any one of the front and rear directions of the slit, and a pair of guide parts for guiding the head part to the slit may be correspondingly formed at left and right ends of the insertion hole, the guide parts having a width therebetween gradually becoming small toward the slit.

Upper catching grooves may be concavely formed in an upper surface of the second spoiler seating groove, and lower catching protrusions protruding from an upper end of the second spoiler and correspondingly inserted into the upper catching grooves may be formed at one end of the second spoiler.

A pair of first transversal steps horizontally bent inward from both ends of the first spoiler in a width direction to support left and the right ends of the frame below the frame, and a first longitudinal step horizontally bent inward from one end of the first spoiler in a length direction to support a front end of the frame below the frame may be formed at a lower portion of the first spoiler, and a pair of second transversal steps horizontally bent inward from both ends of the second spoiler in the width direction to support the left and the right ends of the frame below the frame, and a second longitudinal step horizontally bent inward from one end of the second spoiler in the length direction to support a rear end of the frame below the frame may be formed at a lower portion of the second spoiler.

Bent distal ends of the first transversal steps and the second transversal steps may be closely adhered horizontally to left and right ends of the body.

One ends of the first spoiler and the second spoiler facing each other may be horizontally opened so that both ends of the frame in the front and rear directions are slid and inserted thereinto.

Pressing protrusions may protrude in the front and rear directions on upper surfaces of the first transversal steps and the second transversal steps, respectively, and upper ends of the pressing protrusions may press a lower end of the frame upward.

A pair of vertical wall parts vertically formed at the left and the right of the bracket and a connection shaft horizontally disposed to be perpendicular to upper ends of the vertical wall parts may be formed at an upper end of the bracket, and the adapter may have a pair of side wall parts vertically formed at the left and the right thereof and inserted between the vertical wall parts and a shaft hole formed therein so as to penetrate through the side wall parts so that both ends of the connection shaft in an axial direction are rotatably inserted thereinto.

Any one of a hook connection part having a hook of a front end bent downward and rearward, a side lock connection part having a first side pin and a side clip each protruding on one side surface thereof, a bayonet connection part having a pair of first side plates formed at left and right lower ends thereof and a catching jaw formed at the rear of the first side plates, a side pin connection part having a second side pin protruding on one side surface thereof, a first top lock connection part having a catching end formed at a front end thereof, a pair of second side plates formed at left and right lower ends thereof, and a catching jaw formed at the rear of the second side plates, and a second top lock connection part having a catching end formed at a front end thereof, a pair of third side plates formed at left and right lower ends thereof, and a catching jaw formed at the rear of the third side plates, and having an auxiliary catching end downward bent and extended from an inner peripheral surface of an opening part formed at an upper end thereof toward the front may be formed at a front end of the wiper arm, and a first locking unit positioning the hook connection part on the side wall parts and then locking the hook, a second locking unit horizontally positioning the side clip on the side wall parts and then locking the first side pin, a third locking unit positioning the bayonet connection part on the side wall parts so that the first side plates surround the side wall parts, and then locking the first side plates, a fourth locking unit positioning the side pin connection part on one side surface of any one of the side wall parts and then locking the second side pin, a fifth locking unit locking the catching end and the catching jaw of the first top lock connection part, and the sixth locking unit locking the catching end, the catching jaw, and the auxiliary catching end of the second top lock connection part may be formed at the adapter.

The first locking unit may include a first connection part connecting between the side wall parts and positioned at the front of the shaft hole and a pair of first locking protrusions protruding on corresponding surfaces of the side wall parts so as to be adjacent to the front of the first connection part, elastically deformable leftward and rightward, and having inclined surfaces formed at front ends thereof and catching surfaces formed at rear ends thereof, and in the case in which the hook connection part is positioned on the side wall parts and is then moved rearward, the hook may be positioned at the rear of the catching surfaces while widening the inclined surfaces outward, and an inner surface of the hook may be seated on a front surface of the first connection part.

The second locking unit may include a coupling groove formed in the connection shaft and opened through the shaft hole, and in the case in which the first side pin of the side lock connection part is inserted into the coupling groove through the shaft hole on one side surface of any one of the side wall parts and the side clip of the side lock connection part is then horizontally rotated and positioned on the side wall parts, one end of the side clip may be caught and positioned on outer surfaces of the side wall parts.

The third locking unit may include an outer latch part protruding from one side surface of any one of the side wall parts and having a laterally extended free end elastically deformed and then horizontally returnable, and in the case in which the first side plates of the bayonet connection part are horizontally positioned on the side wall parts, the catching jaw of the first side plate may be caught and positioned at a front end of the outer latch part.

The fourth locking unit may include a notch hole positioned behind the shaft hole and formed in the side wall parts so as to penetrate through the side wall parts, a second connection part connecting between the side wall parts and positioned behind the first connection part so as to be spaced apart from the first connection part, and an inner latch part extended rearward from the second connection part and having a rearward extended free end elastically deformed upward and then horizontally returnable, and in the case in which the second side pin of the side pin connection part is horizontally inserted into the notch hole on one side surface of any one of the side wall parts, the inner latch part may ascend and then descend to its original position to be thus caught and positioned on an outer surface of the second side pin.

The fifth locking unit and the sixth locking unit may include second locking protrusions protruding from the corresponding surfaces of the side wall parts so as to be adjacent to the front of the first locking protrusions and a stopper protruding from one side surface of any one of the side wall parts and positioned above the outer latch part so as to be spaced apart from the outer latch part, in the case in which the catching jaw of the first top lock connection part is caught and positioned at a front end of the stopper and is then positioned horizontally on the side wall parts, the catching end may be caught and positioned at a lower end of the second locking protrusion and the catching jaw may be caught and positioned at the front end of the stopper, and in the case in which the auxiliary catching end of the second top lock connection part is caught and positioned at a lower end of the inner latch part and the catching jaw of the second top lock connection part is caught and positioned at the front end of the stopper and is then positioned horizontally on the side wall parts, the catching end may be caught and positioned at the lower end of the second locking protrusion.

A cover may be coupled to front ends of the side wall parts so as to be rotatable forward and rearward, and the cover may open upper portions of the side wall parts at the time of being rotated forward and close the upper portions of the side wall parts at the time of being rotated rearward.

Locking bars protruding laterally and then bent and extended forward and elastically deformable leftward and rightward may be further formed on outer surfaces of the side wall parts, respectively, and locking grooves may be formed at left and right ends of the cover, respectively, so that the locking bars are correspondingly inserted thereinto while surrounding left and right surfaces of the cover in the case of closing the cover.

Inclined surfaces for expanding the locking bars leftward and rightward and then inserting the locking bars into the locking grooves in the case of closing the cover may be formed below the locking grooves.

Pushing parts cut to be returnable after a push operation may be formed on the left and right surfaces of the cover, respectively, and at the time of a pushing operation of the pushing parts, the locking bars may be separated from the locking grooves.

BRIEF DESCRIPTION OF THE DRAWINGS

FIG. 30 is a perspective view illustrating a first top lock connection part of the device for connecting a wiper blade to a wiper arm according to an exemplary embodiment of the present disclosure.

FIGS. 31A and 31B are installation state diagrams illustrating a process of connecting the first top lock connection part of the device for connecting a wiper blade to a wiper arm according to an exemplary embodiment of the present disclosure.

DETAILED DESCRIPTION

Hereinafter, exemplary embodiments of the present disclosure will be described in detail with reference to the accompanying drawings.

Advantages and features of the present disclosure and methods accomplishing them will become apparent from the following description of exemplary embodiments with reference to the accompanying drawings.

However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims.

Further, in describing the present disclosure, in the case in which it is decided that the well-known art related to the present disclosure may obscure the gist of the present disclosure, a detailed description for the well-known art will be omitted.

Figure 1:
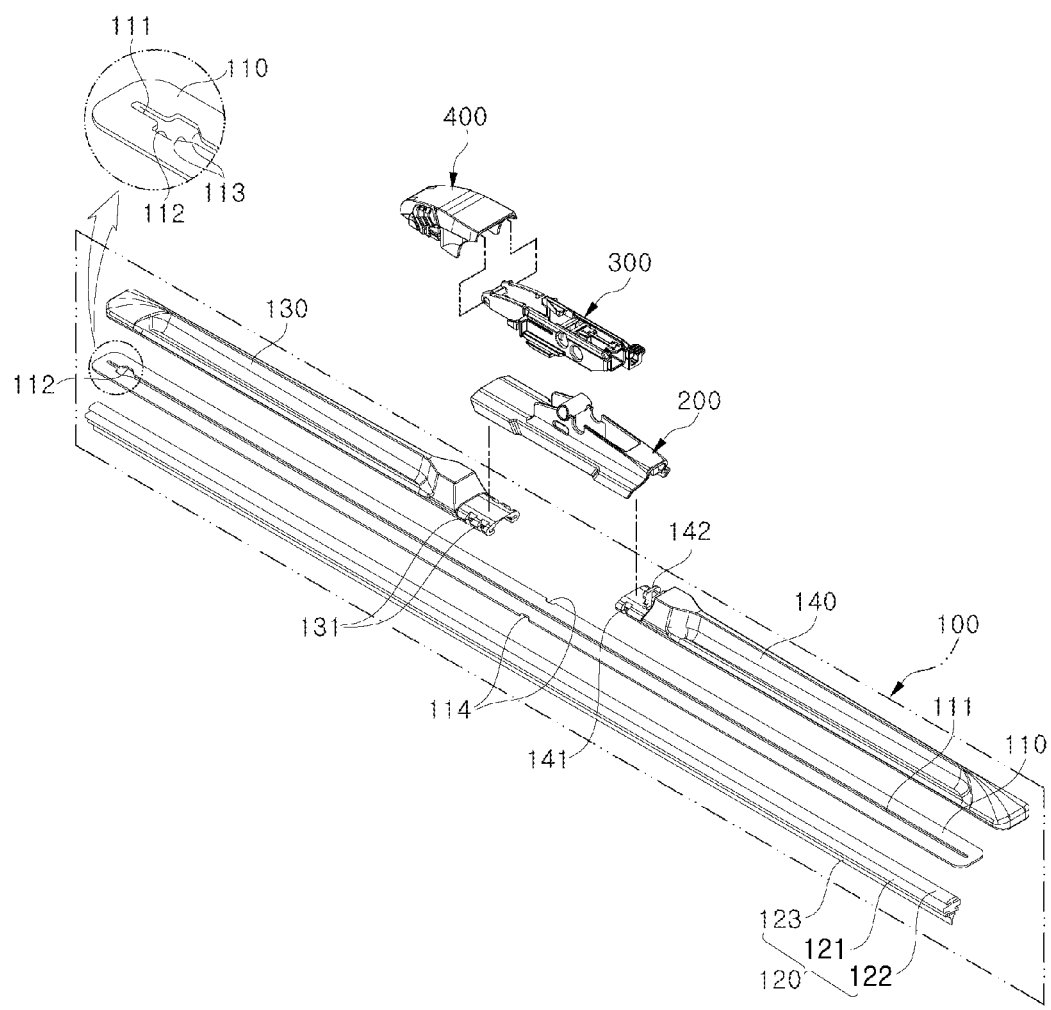
FIG. 1 is an exploded perspective view illustrating a device for connecting a wiper blade to a wiper arm according to an exemplary embodiment of the present disclosure.
Figure 2:
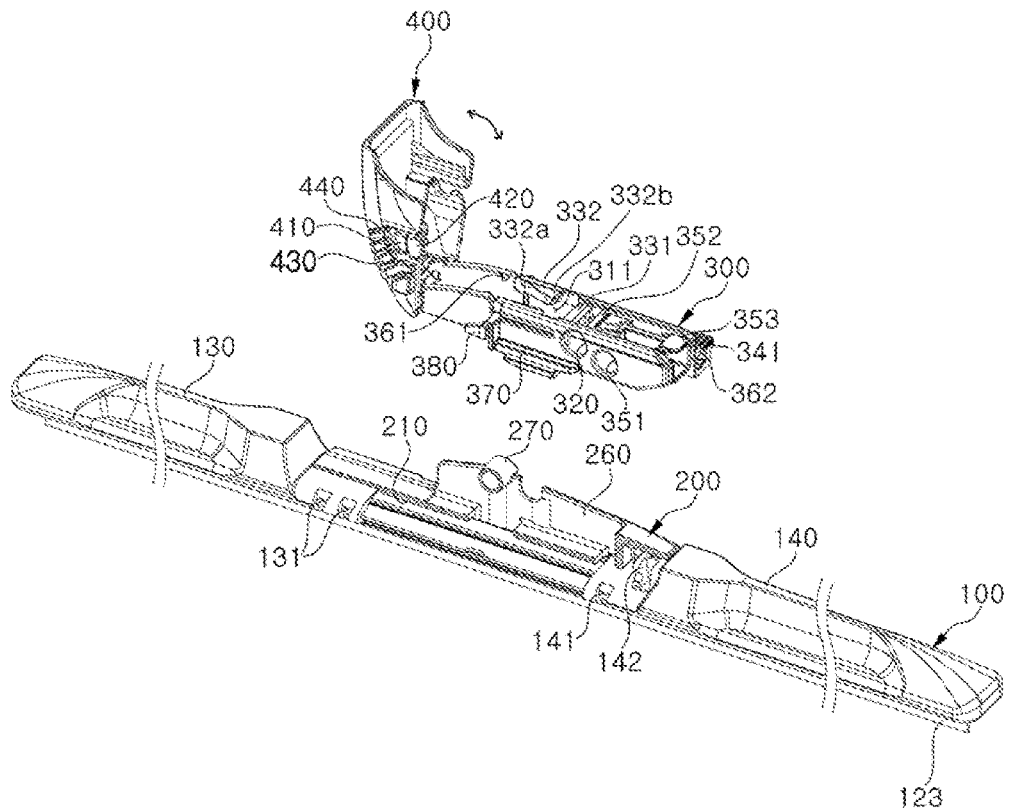
FIG. 2 is a partially cut-away exploded perspective view illustrating the device for connecting a wiper blade to a wiper arm according to an exemplary embodiment of the present disclosure.
Figure 3:
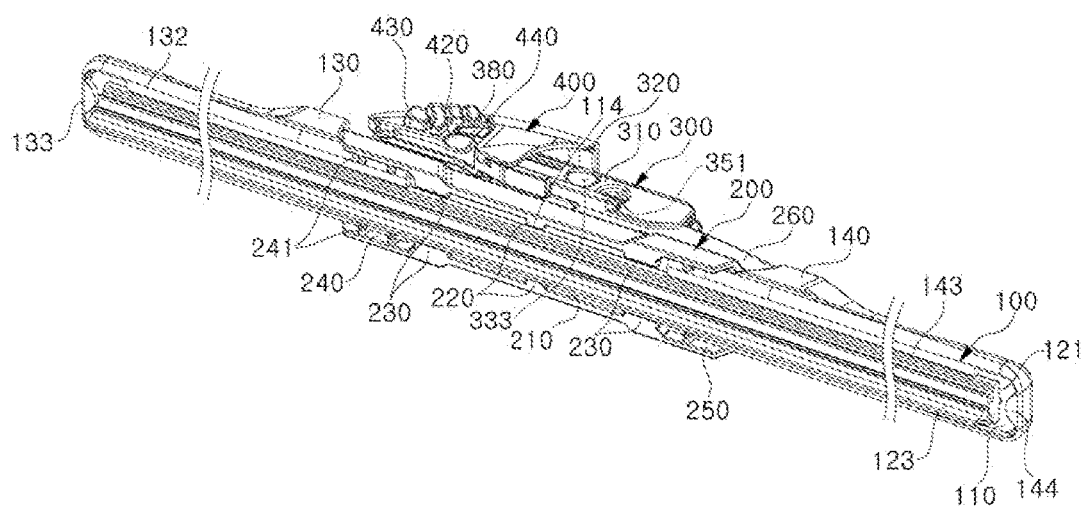
FIG. 3 is a perspective view illustrating a bottom surface of the device for connecting a wiper blade to a wiper arm according to an exemplary embodiment of the present disclosure.

FIG. 1 is an exploded perspective view illustrating a device for connecting a wiper blade to a wiper arm according to an exemplary embodiment of the present disclosure, FIG. 2 is a partially cut-away exploded perspective view illustrating the device for connecting a wiper blade to a wiper arm according to an exemplary embodiment of the present disclosure, and FIG. 3 is a perspective view illustrating a bottom surface of the device for connecting a wiper blade to a wiper arm according to an exemplary embodiment of the present disclosure.

Figure 4:
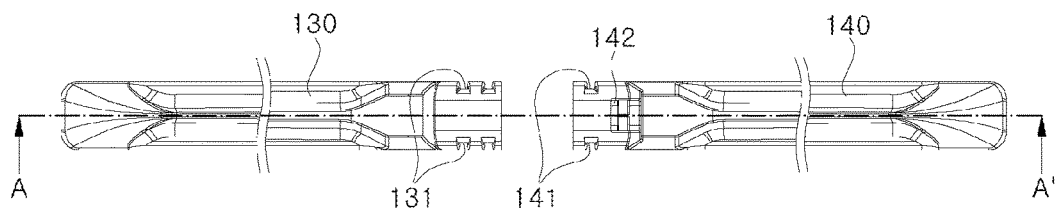
FIG. 4 is a plan view illustrating a first spoiler and a second spoiler of the device for connecting a wiper blade to a wiper arm according to an exemplary embodiment of the present disclosure.
Figure 5:
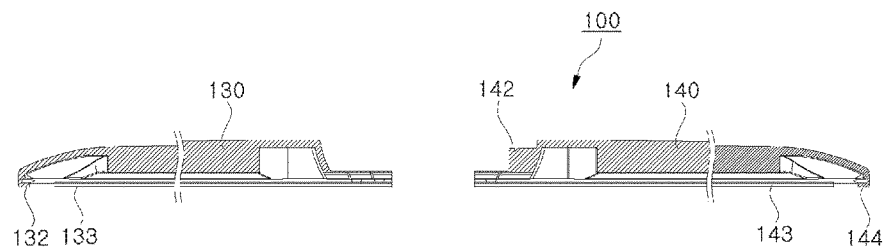
FIG. 5 is a cross-sectional view illustrating the first spoiler and the second spoiler of the device for connecting a wiper blade to a wiper arm according to an exemplary embodiment of the present disclosure, taken along line A-A'.
Figure 6:
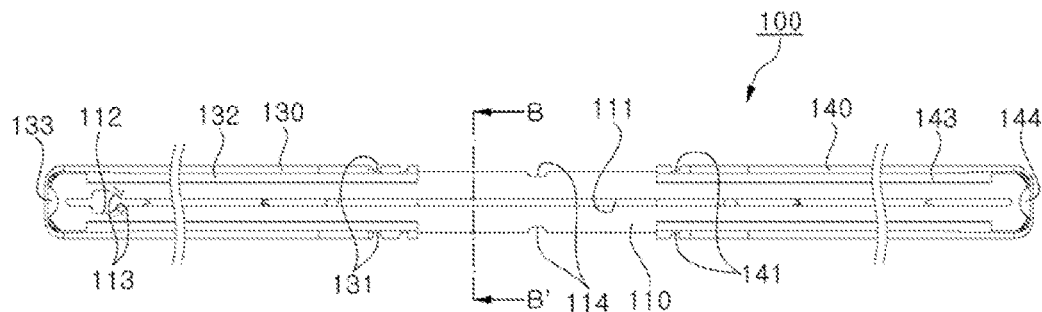
FIG. 6 is a bottom view illustrating a coupling structure between the first and second spoilers and a frame of the device for connecting a wiper blade to a wiper arm according to an exemplary embodiment of the present disclosure.

FIG. 4 is a plan view illustrating a first spoiler and a second spoiler of the device for connecting a wiper blade to a wiper arm according to an exemplary embodiment of the present disclosure, FIG. 5 is a cross-sectional view illustrating the first spoiler and the second spoiler of the device for connecting a wiper blade to a wiper arm according to an exemplary embodiment of the present disclosure, taken along line A-A', and FIG. 6 is a bottom view illustrating a coupling structure between the first and second spoilers and a frame of the device for connecting a wiper blade to a wiper arm according to an exemplary embodiment of the present disclosure.

Figure 7:
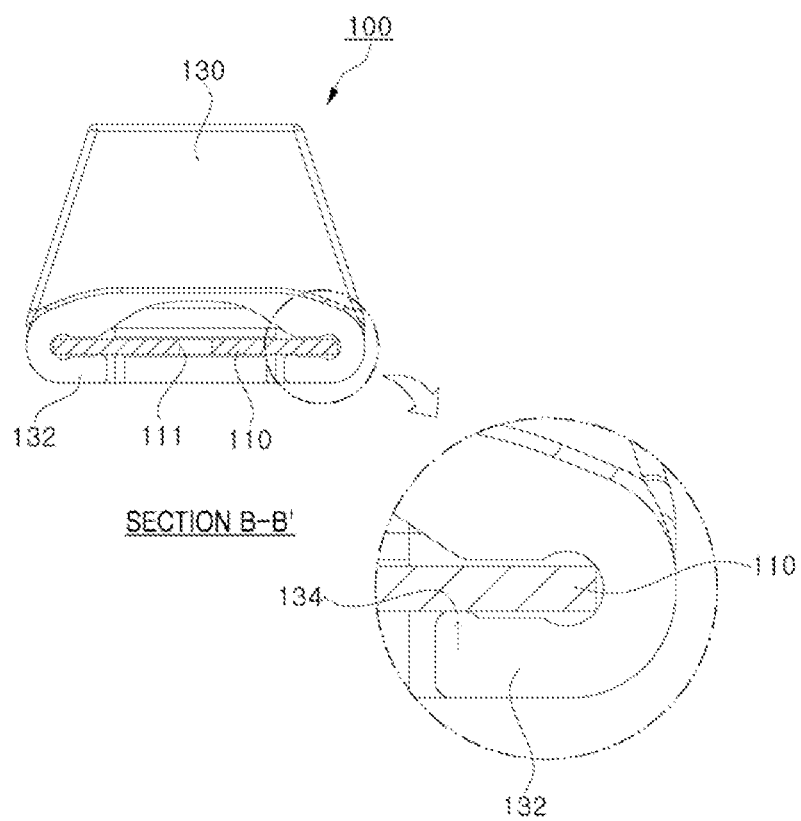
FIG. 7 is a cross-sectional view illustrating a coupling structure between the first spoiler and the frame of the device for connecting a wiper blade to a wiper arm according to an exemplary embodiment of the present disclosure, taken along line B-B'.
Figure 8:
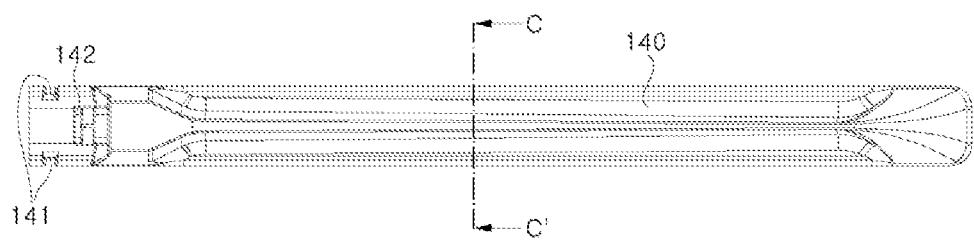
FIG. 8 is a plan view illustrating the second spoiler of the device for connecting a wiper blade to a wiper arm according to an exemplary embodiment of the present disclosure.
Figure 9:
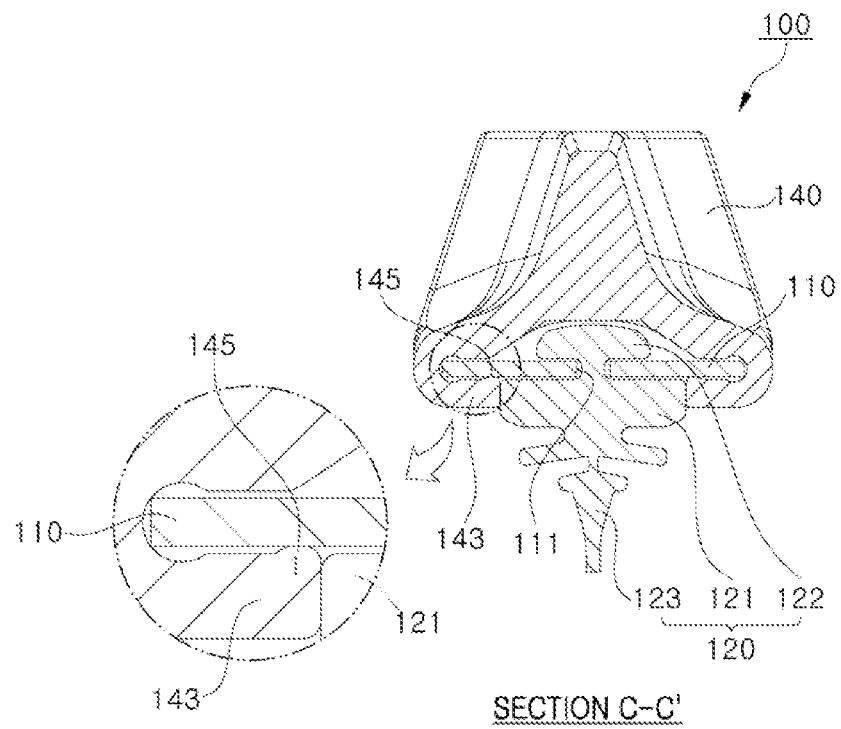
FIG. 9 is a cross-sectional view illustrating a coupling structure among the second spoiler, the frame, and a strip of the device for connecting a wiper blade to a wiper arm according to an exemplary embodiment of the present disclosure, taken along line C-C'.

FIG. 7 is a cross-sectional view illustrating a coupling structure between the first spoiler and the frame of the device for connecting a wiper blade to a wiper arm according to an exemplary embodiment of the present disclosure, taken along line B-B', FIG. 8 is a plan view illustrating the second spoiler of the device for connecting a wiper blade to a wiper arm according to an exemplary embodiment of the present disclosure, and FIG. 9 is a cross-sectional view illustrating a coupling structure among the second spoiler, the frame, and a strip of the device for connecting a wiper blade to a wiper arm according to an exemplary embodiment of the present disclosure, taken along line C-C'.

Figure 10:
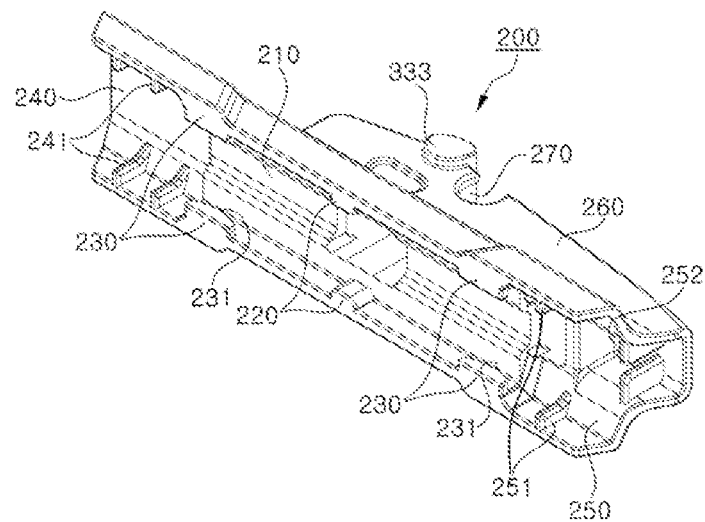
FIG. 10 is a perspective view illustrating a bottom surface of a bracket in the device for connecting a wiper blade to a wiper arm according to an exemplary embodiment of the present disclosure.
Figure 11:
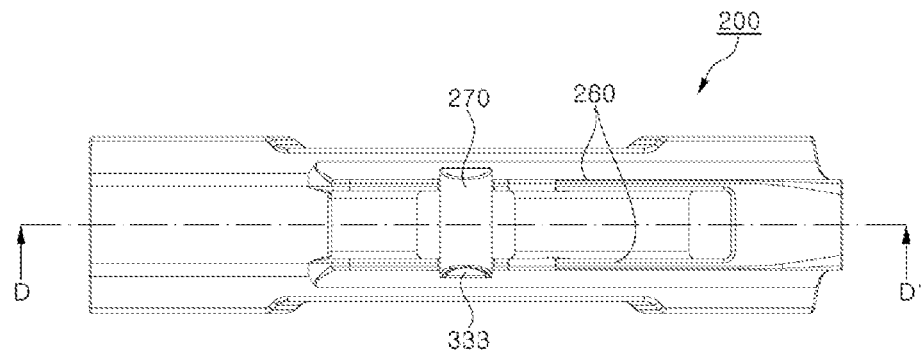
FIG. 11 is a plan view illustrating the bracket of the device for connecting a wiper blade to a wiper arm according to an exemplary embodiment of the present disclosure.
Figure 12:
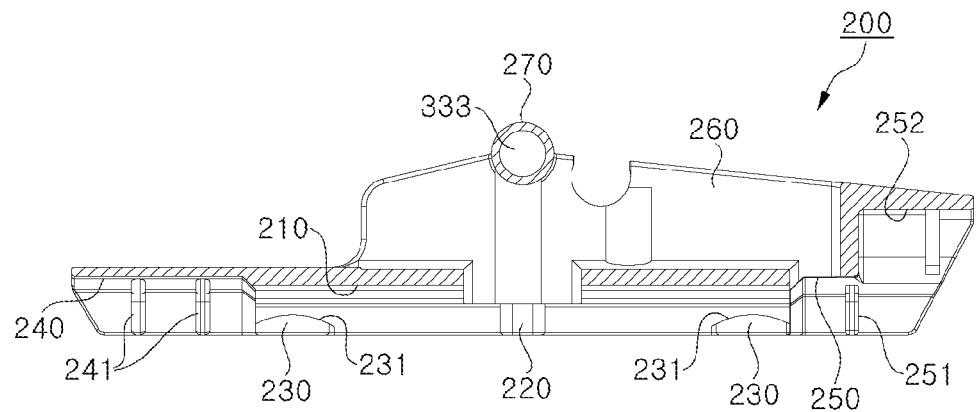
FIG. 12 is a cross-sectional view illustrating the bracket of the device for connecting a wiper blade to a wiper arm according to an exemplary embodiment of the present disclosure, taken along line D-D'.

FIG. 10 is a perspective view illustrating a bottom surface of a bracket in the device for connecting a wiper blade to a wiper arm according to an exemplary embodiment of the present disclosure, FIG. 11 is a plan view illustrating the bracket of the device for connecting a wiper blade to a wiper arm according to an exemplary embodiment of the present disclosure, and FIG. 12 is a cross-sectional view illustrating the bracket of the device for connecting a wiper blade to a wiper arm according to an exemplary embodiment of the present disclosure, taken along line D-D'.

Figure 13:
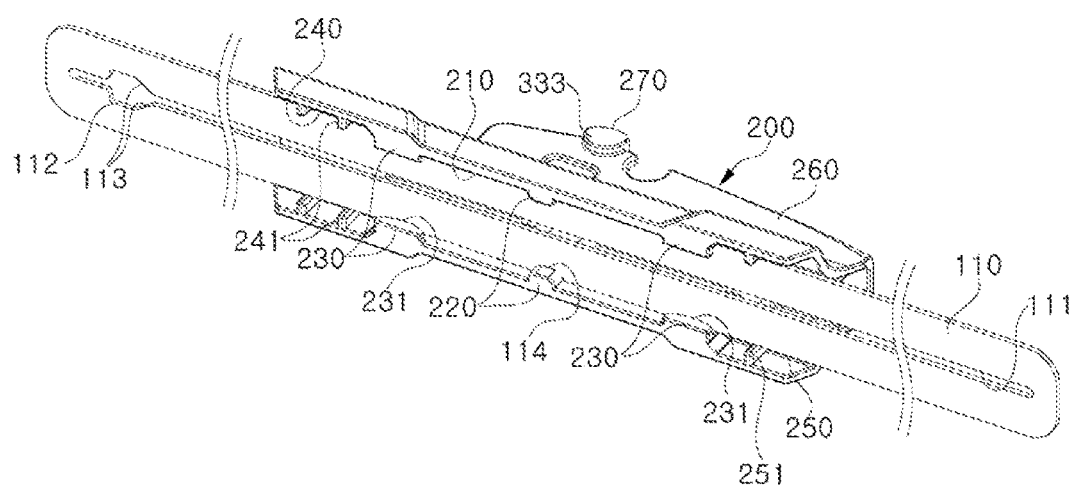
FIG. 13 is a perspective view illustrating a coupling structure between the bracket and the frame in the device for connecting a wiper blade to a wiper arm according to an exemplary embodiment of the present disclosure.
Figure 14:
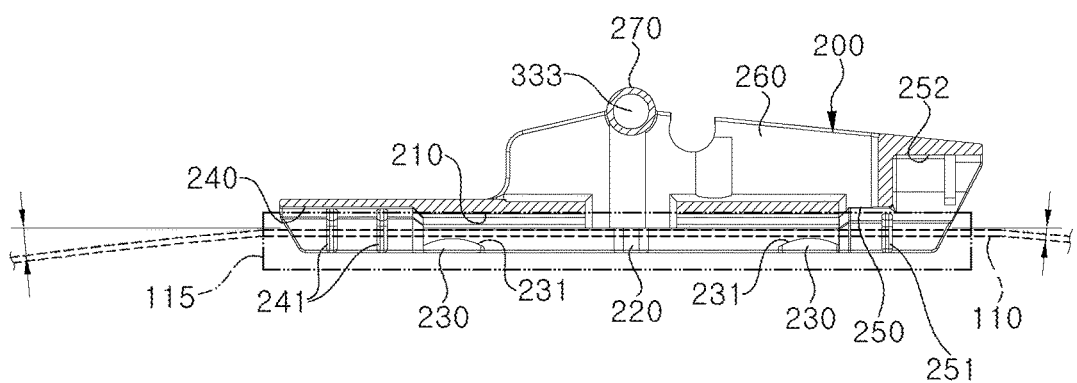
FIG. 14 is a cross-sectional view illustrating a shape of the frame in the device for connecting a wiper blade to a wiper arm according to an exemplary embodiment of the present disclosure.
Figure 15:
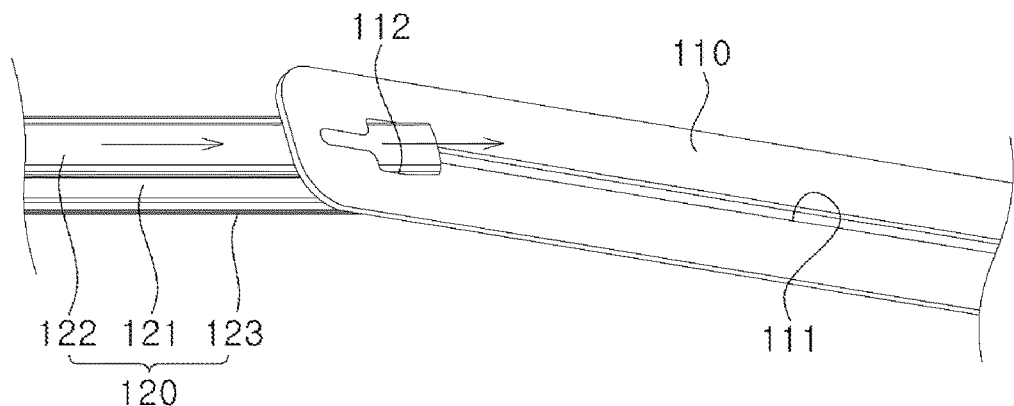
FIG. 15 is a perspective view illustrating a process of coupling between the frame and the strip of the device for connecting a wiper blade to a wiper arm according to an exemplary embodiment of the present disclosure.

FIG. 13 is a perspective view illustrating a coupling structure between the bracket and the frame in the device for connecting a wiper blade to a wiper arm according to an exemplary embodiment of the present disclosure, FIG. 14 is a cross-sectional view illustrating a shape of the frame in the device for connecting a wiper blade to a wiper arm according to an exemplary embodiment of the present disclosure, and FIG. 15 is a perspective view illustrating a process of coupling between the frame and the strip of the device for connecting a wiper blade to a wiper arm according to an exemplary embodiment of the present disclosure.

Figure 16:
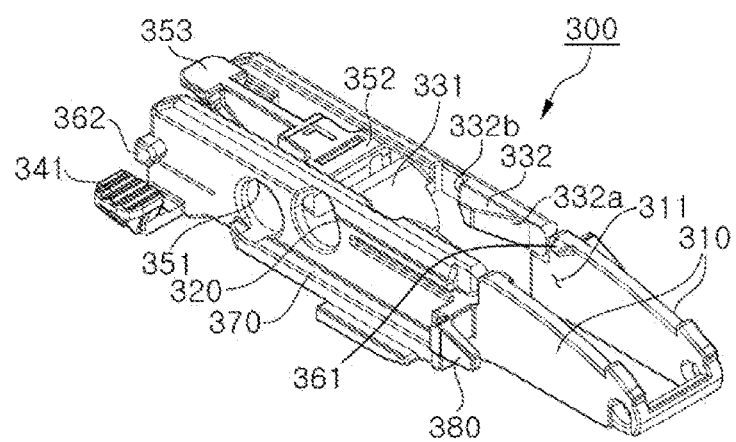
FIG. 16 is a perspective view illustrating an adapter of the device for connecting a wiper blade to a wiper arm according to an exemplary embodiment of the present disclosure.
Figure 17:
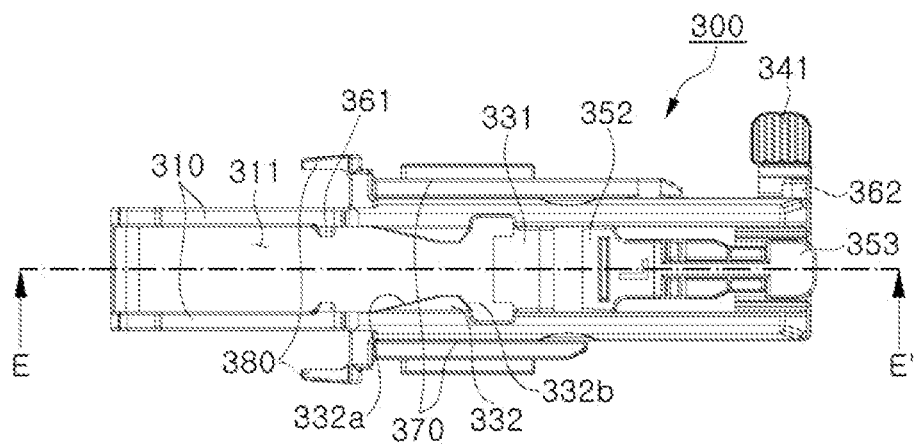
FIG. 17 is a plan view illustrating the adapter of the device for connecting a wiper blade to a wiper arm according to an exemplary embodiment of the present disclosure.
Figure 18:
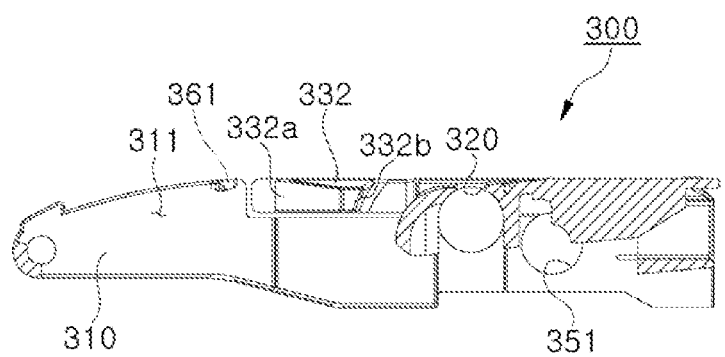
FIG. 18 is a cross-sectional view illustrating the adapter of the device for connecting a wiper blade to a wiper arm according to an exemplary embodiment of the present disclosure, taken along line E-E'.

FIG. 16 is a perspective view illustrating an adapter of the device for connecting a wiper blade to a wiper arm according to an exemplary embodiment of the present disclosure, FIG. 17 is a plan view illustrating the adapter of the device for connecting a wiper blade to a wiper arm according to an exemplary embodiment of the present disclosure, and FIG. 18 is a cross-sectional view illustrating the adapter of the device for connecting a wiper blade to a wiper arm according to an exemplary embodiment of the present disclosure, taken along line E-E'.

Figure 19:
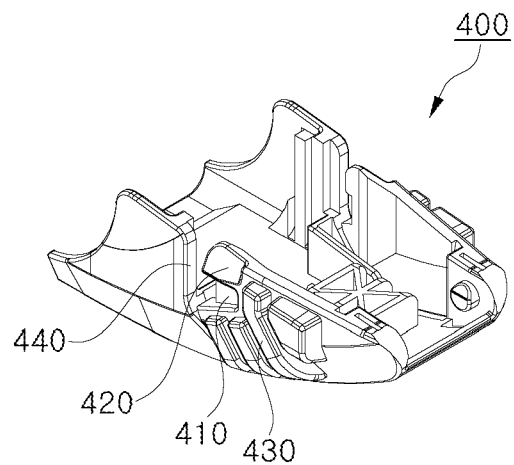
FIG. 19 is a perspective view illustrating a bottom surface of a cover in the device for connecting a wiper blade to a wiper arm according to an exemplary embodiment of the present disclosure.
Figure 20:
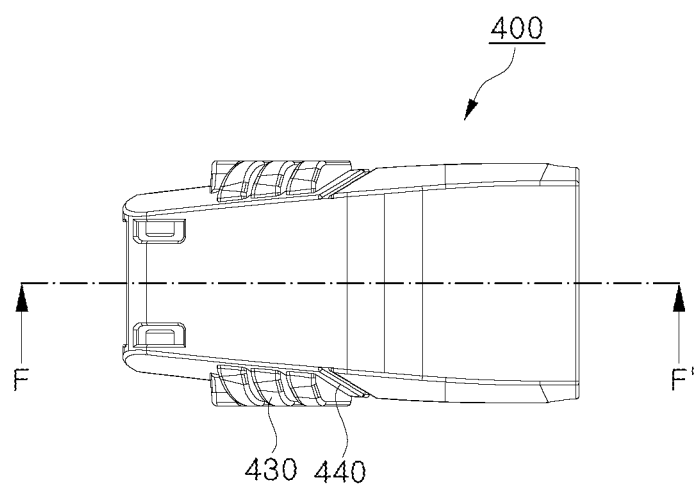
FIG. 20 is a plan view illustrating the cover of the device for connecting a wiper blade to a wiper arm according to an exemplary embodiment of the present disclosure.
Figure 21:
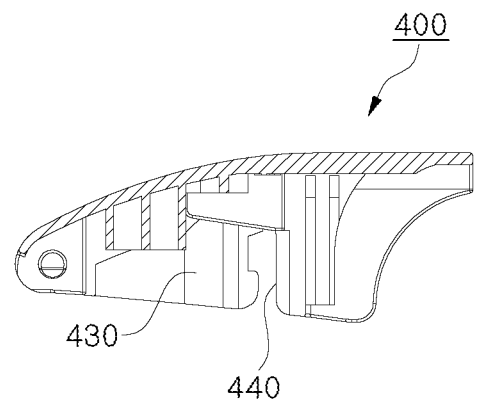
FIG. 21 is a cross-sectional view illustrating the cover of the device for connecting a wiper blade to a wiper arm according to an exemplary embodiment of the present disclosure, taken along line F-F'.

FIG. 19 is a perspective view illustrating a bottom surface of a cover in the device for connecting a wiper blade to a wiper arm according to an exemplary embodiment of the present disclosure, FIG. 20 is a plan view illustrating the cover of the device for connecting a wiper blade to a wiper arm according to an exemplary embodiment of the present disclosure, and FIG. 21 is a cross-sectional view illustrating the cover of the device for connecting a wiper blade to a wiper arm according to an exemplary embodiment of the present disclosure, taken along line F-F'.

Figure 22:
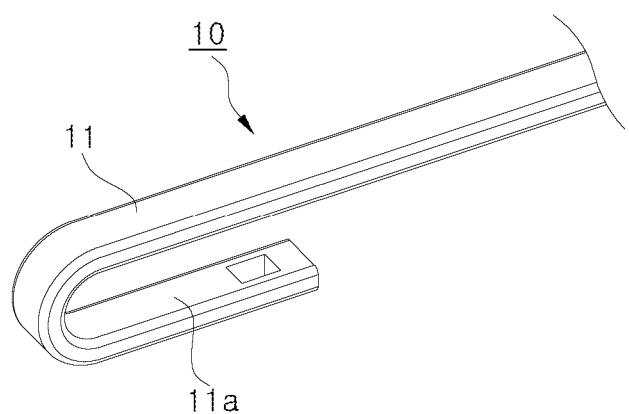
FIG. 22 is a perspective view illustrating a hook connection part of the device for connecting a wiper blade to a wiper arm according to an exemplary embodiment of the present disclosure.
Figures 23A, 23B:
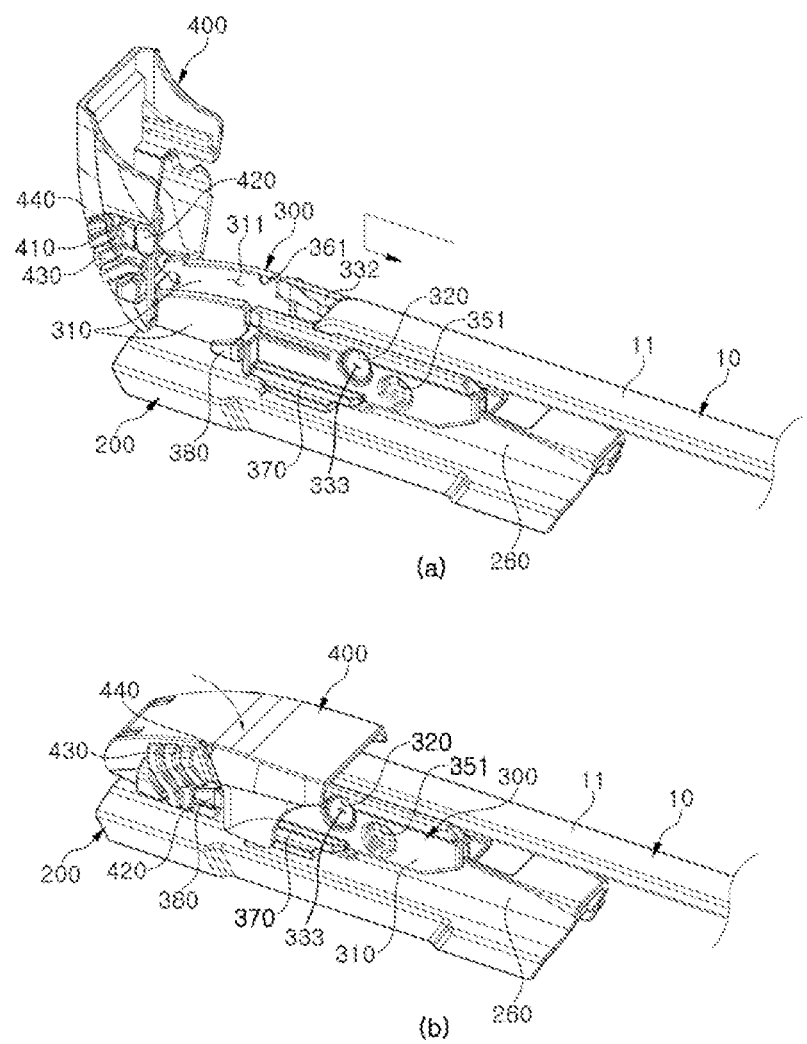
FIGS. 23A and 23B are installation state diagrams illustrating a process of connecting the hook connection part of the device for connecting a wiper blade to a wiper arm according to an exemplary embodiment of the present disclosure.
Figure 24:
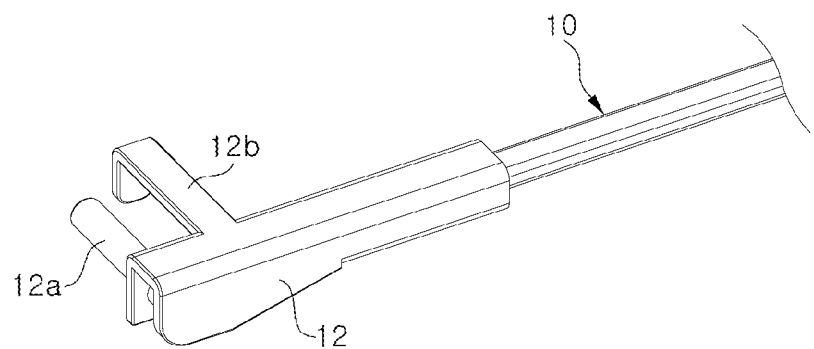
FIG. 24 is a perspective view illustrating a side lock connection part of the device for connecting a wiper blade to a wiper arm according to an exemplary embodiment of the present disclosure.

FIG. 22 is a perspective view illustrating a hook connection part of the device for connecting a wiper blade to a wiper arm according to an exemplary embodiment of the present disclosure, FIGS. 23A and 23B are installation state diagrams illustrating a process of connecting the hook connection part of the device for connecting a wiper blade to a wiper arm according to an exemplary embodiment of the present disclosure, and FIG. 24 is a perspective view illustrating a side lock connection part of the device for connecting a wiper blade to a wiper arm according to an exemplary embodiment of the present disclosure.

Figures 25A, 25B, 25C:
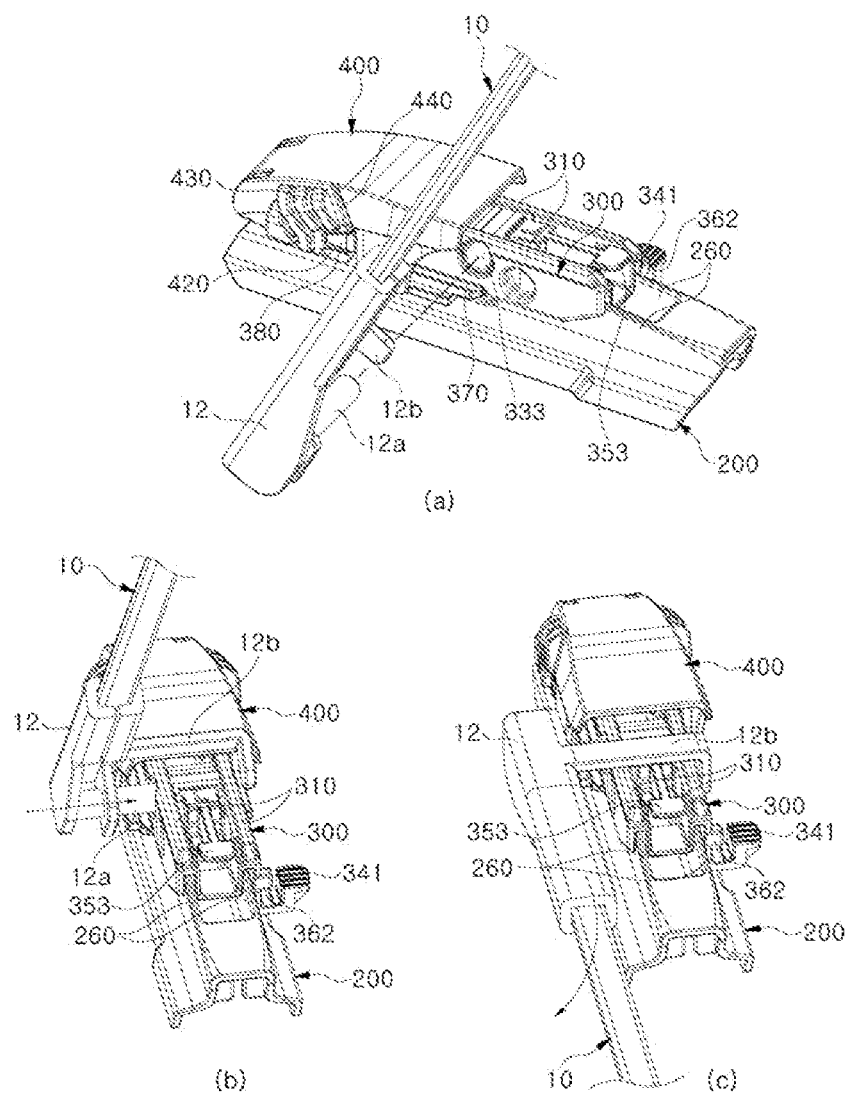
FIGS. 25A to 25C are installation state diagrams illustrating a process of connecting the side lock connection part of the device for connecting a wiper blade to a wiper arm according to an exemplary embodiment of the present disclosure.
Figure 26:
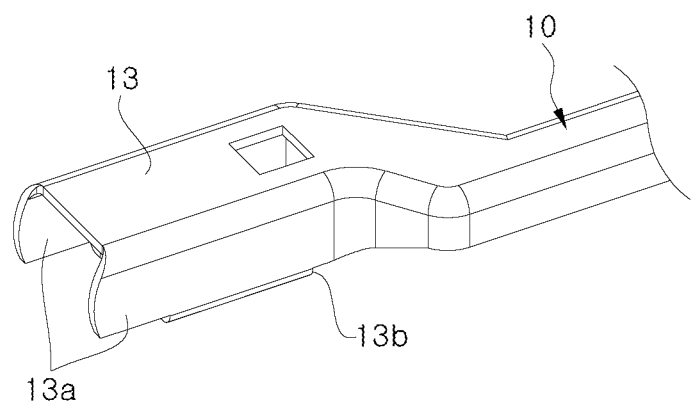
FIG. 26 is a perspective view illustrating a bayonet connection part of the device for connecting a wiper blade to a wiper arm according to an exemplary embodiment of the present disclosure.
Figures 27A, 27B, 27C:
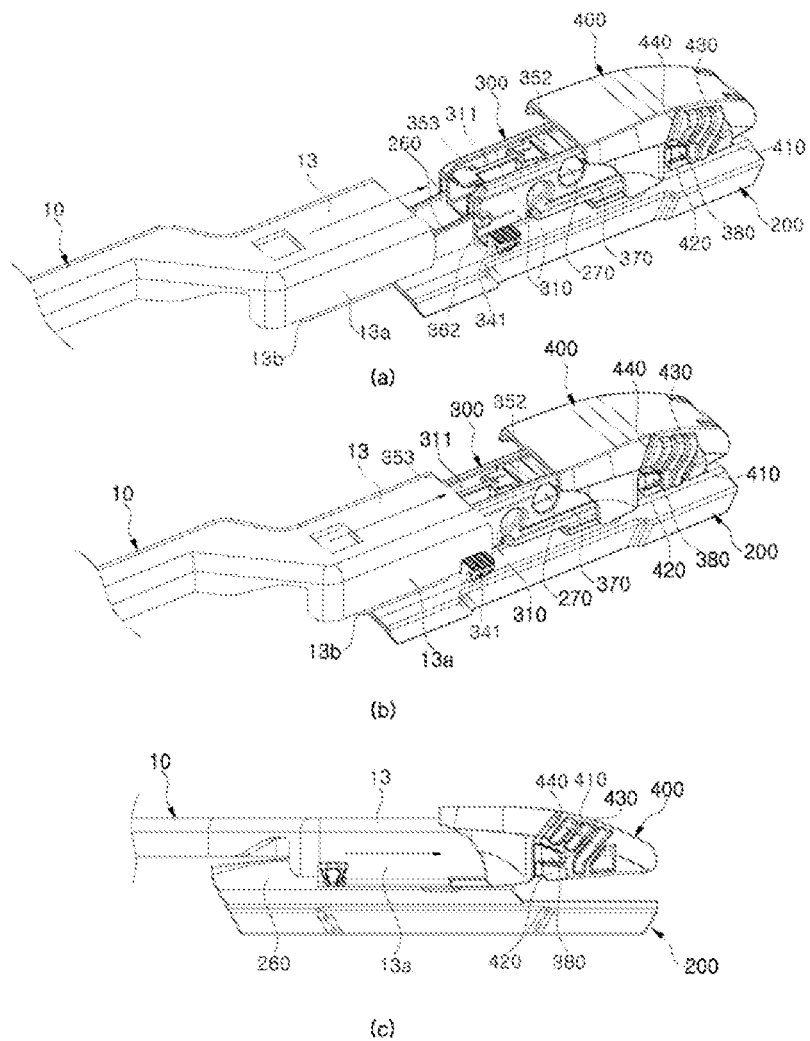
FIGS. 27A to 27C are installation state diagrams illustrating a process of connecting the bayonet connection part of the device for connecting a wiper blade to a wiper arm according to an exemplary embodiment of the present disclosure.

FIGS. 25A to 25C are installation state diagrams illustrating a process of connecting the side lock connection part of the device for connecting a wiper blade to a wiper arm according to an exemplary embodiment of the present disclosure, FIG. 26 is a perspective view illustrating a bayonet connection part of the device for connecting a wiper blade to a wiper arm according to an exemplary embodiment of the present disclosure, and FIGS. 27A to 27C are installation state diagrams illustrating a process of connecting the bayonet connection part of the device for connecting a wiper blade to a wiper arm according to an exemplary embodiment of the present disclosure.

Figure 28:
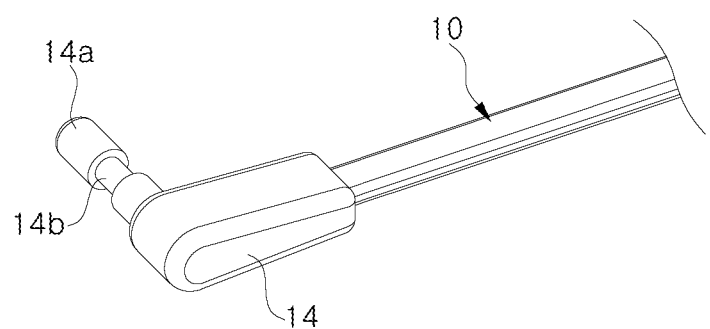
FIG. 28 is a perspective view illustrating a side pin connection part of the device for connecting a wiper blade to a wiper arm according to an exemplary embodiment of the present disclosure.
Figure 29A:
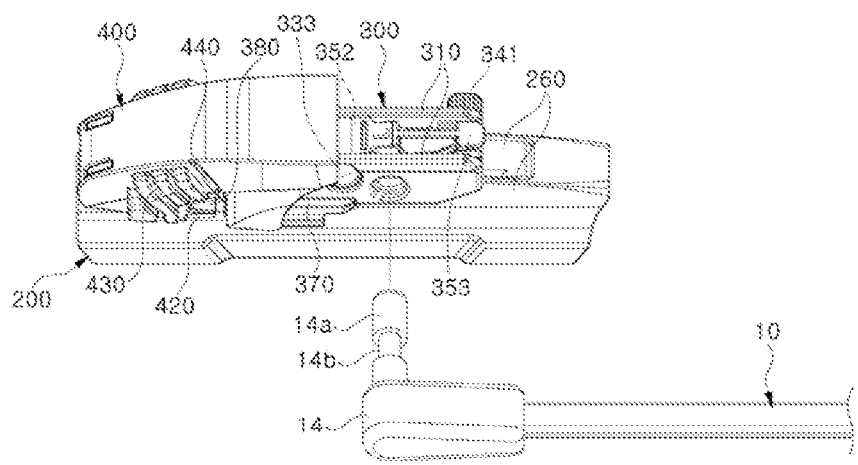
FIGS. 29A and 29B are installation state diagrams illustrating a process of connecting the side pin connection part of the device for connecting a wiper blade to a wiper arm according to an exemplary embodiment of the present disclosure.
Figure 29B:
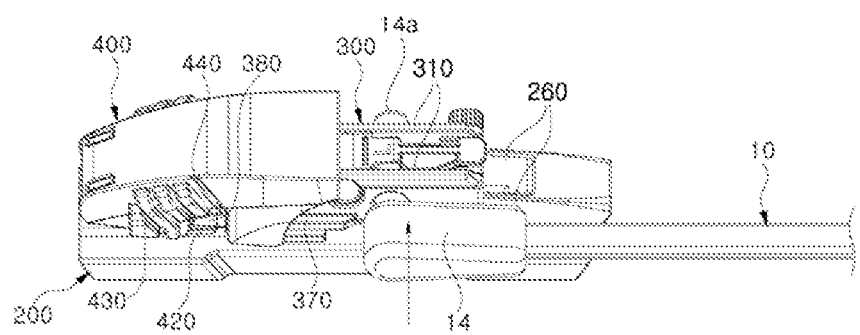

FIG. 28 is a perspective view illustrating a side pin connection part of the device for connecting a wiper blade to a wiper arm according to an exemplary embodiment of the present disclosure, FIGS. 29A and 29B are installation state diagrams illustrating a process of connecting the side pin connection part of the device for connecting a wiper blade to a wiper arm according to an exemplary embodiment of the present disclosure, and FIG. 30 is a perspective view illustrating a first top lock connection part of the device for connecting a wiper blade to a wiper arm according to an exemplary embodiment of the present disclosure.

Figure 32:
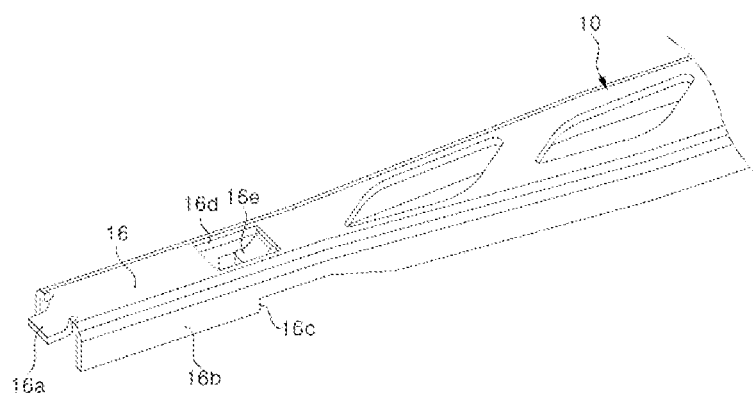
FIG. 32 is a perspective view illustrating a second top lock connection part of the device for connecting a wiper blade to a wiper arm according to an exemplary embodiment of the present disclosure.
Figures 33A, 33B, 33C:
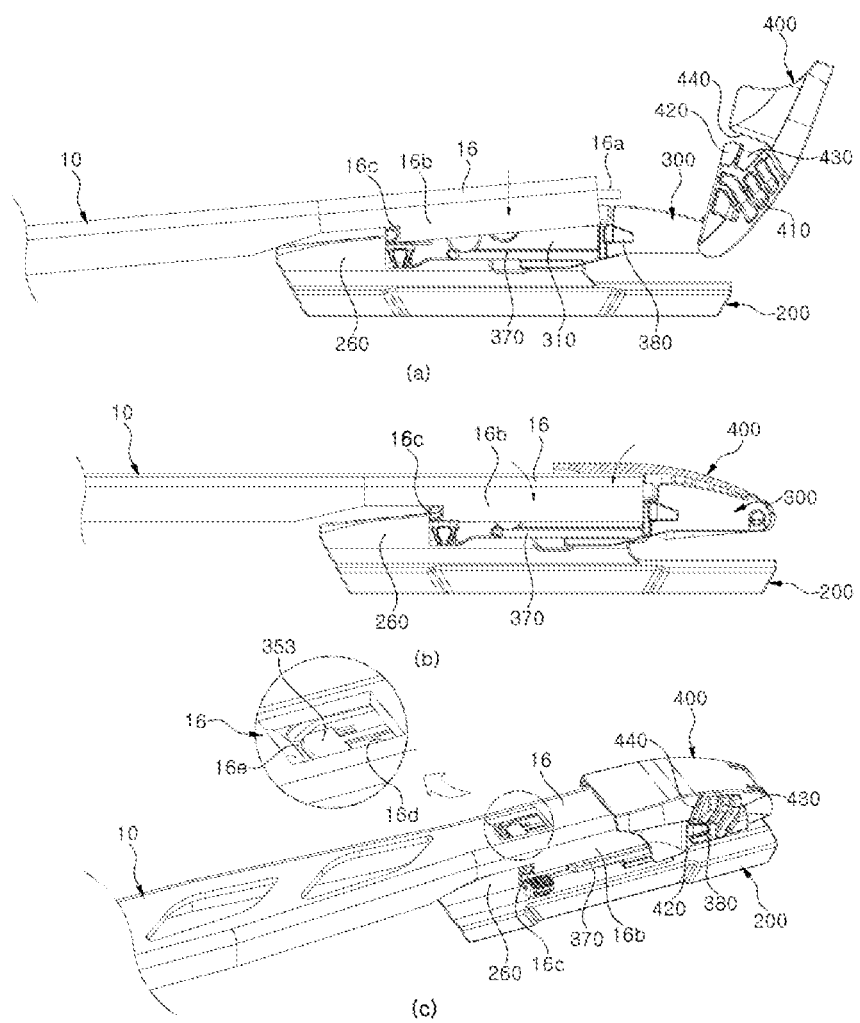
FIGS. 33A to 33C are installation state diagrams illustrating a process of connecting the second top lock connection part of the device for connecting a wiper blade to a wiper arm according to an exemplary embodiment of the present disclosure.

FIGS. 31A and 31B are installation state diagrams illustrating a process of connecting the first top lock connection part of the device for connecting a wiper blade to a wiper arm according to an exemplary embodiment of the present disclosure, FIG. 32 is a perspective view illustrating a second top lock connection part of the device for connecting a wiper blade to a wiper arm according to an exemplary embodiment of the present disclosure, and FIGS. 33A to 33C are installation state diagrams illustrating a process of connecting the second top lock connection part of the device for connecting a wiper blade to a wiper arm according to an exemplary embodiment of the present disclosure.

Referring to FIGS. 1 to 33, the device for connecting a wiper blade to a wiper arm according to an exemplary embodiment of the present disclosure includes a wiper blade 100, a bracket 200, an adapter 300, and a cover 400.

In addition, any one of a hook connection part 11, a side lock connection part 12, a bayonet connection part 13, a side pin connection part 14, a first top lock connection part 15, and a second top lock connection part 16 is selectively formed at a front end of a wiper arm 10 connected to the adopter 300.

First, the hook connection part 11 has a hook 11a of a front end bent downward and rearward, as illustrated in detail in FIG. 22. In this case, an outer surface and an inner surface of the hook 11a have a curved (semi-circular) shape.

The side lock connection part 12 has a first side pin 12a and a side clip 12b horizontally protruding on one side surface thereof, as illustrated in detail in FIG. 24 to FIG. 25C.

Here, a protruding distal end of the side clip 12b may have a shape in which it is bent in a downward direction (an installation direction) in order to be caught and positioned on an outer surface of a side wall part 310 to be described below.

The bayonet connection part 13 has a pair of first side plates 13a formed at left and right lower ends thereof and a catching jaw 13b formed at the rear of the first side plates 13a, as illustrated in detail in FIG. 26 to FIG. 27C.

The side pin connection part 14 has a second side pin 14a horizontally protruding on one side surface thereof, as illustrated in detail in FIG. 28 to FIG. 29B.

Here, a groove 14b may be concavely formed in an outer surface of the second side pin 14a so that a lower end of an inner latch part 353 to be described below may be caught and positioned thereon.

The first top lock connection part 15 has a catching end 15a formed at a front end thereof, a pair of second side plates 15b formed at left and right lower ends thereof, and a catching jaw 15c formed at the rear of the second side plates 15b, as illustrated in detail in FIG. 30 to FIG. 31B.

The second top lock connection part 16 has a catching end 16a formed at a front end thereof, a pair of third side plates 16b formed at left and right lower ends thereof, and a catching jaw 16c formed at the rear of the third side plates 16b, as illustrated in detail in FIG. 32 to FIG. 33C.

In addition, an opening part 16d is formed in an upper end of the second top lock connection part 16 so as to vertically penetrate through the second top lock connection part 16, and an auxiliary catching end 16e is downward bent and extended from an inner peripheral surface of the opening part 16d toward the front.

A front end of the auxiliary catching end 16e is used to be caught and positioned at a lower end of a free end side of an inner latch part 353 to be described below.

The wiper blade 100 may include a frame 110, a strip 120, a first spoiler 130, and a second spoiler 140, as illustrated in FIG. 1.

The frame 110 has a length in front and rear directions, as illustrated in FIGS. 1 to 3, and a width of the frame 110 in left and right directions is relatively narrow.

Here, the frame 110, which is to couple a strip 120 to be described below, may be formed of a material such as a metal or plastic having a predetermined strength.

In addition, a slit 111 having a predetermined width is formed in the front and rear directions so as to vertically penetrate through the frame 110 so that a head part 122 of a strip 120 to be described below may be coupled thereto.

In this case, an insertion hole 112 for coupling one end of a head part 122 in a length direction to be described below is formed at one end of the slit 111 in the front and rear directions, as illustrated in FIG. 15.

The insertion hole 112, which is formed at a width wider than that of the slit 111 along the left and the right, is formed at a width at which a head part 122 to be described below may be inserted thereinto through a lower portion thereof.

In addition, a pair of guide parts 113 for guiding a head part 122 to be described below to the slit 111 are correspondingly formed at left and right ends of the insertion hole 112.

The guide parts 113 are positioned in a direction in which the head part 122 is inserted, and have a form in which a width therebetween gradually becomes small toward the center of the slit 111 positioned in a slide insertion direction.

In this case, the guide parts 113 have inclined end portions formed toward the center of the slit 111, and thus, the head part 122 inserted upward through the lower portion of the insertion hole 112 may move to the center of the slit 111.

That is, the guide parts 113 guide the head part 122 toward the center of the slit 111, thereby making it possible to easily couple the strip 120.

In addition, cut grooves 114 into which position protrusions 220 of a bracket 200 to be described below are correspondingly inserted are concavely formed at left and right ends of the frame 110, respectively.

The cut grooves 114 allow the frame 110 not to move in the front and rear directions in the case of positioning the frame 110 in a frame seating groove 210 to be described below.

Here, the cut grooves 114 may be formed at central positions of the frame 110. However, positions of the cut grooves 114 may be variously applied, if necessary.

In addition, the frame 110 may have a bent shape so that both ends thereof in the front and rear directions are downward bent to form a predetermined curvature, as illustrated in detail in FIG. 14.

Further, a linear part 115 of which both ends in the front and rear directions are supported on upper ends of support protrusions 230 and an upper end is closely adhered to and horizontally disposed on an upper surface of the frame seating groove 210 may be formed at the center of the frame 110. The linear part 115 may be formed at a length corresponding to that of the frame seating groove 210.

The strip 120, which is coupled to the slit 111 of the frame 110, as illustrated in detail in FIGS. 1 to 3, has a lower end contacting a wind shield (not illustrated) of a vehicle.

Here, the strip 120 has a length in the front and rear directions, and a width of the strip 120 in the left and right directions is relatively narrow.

In addition, the strip 120 may be formed of a rubber material or an elastomer material, but various materials may be selectively used as a material of the strip 120.

In more detail, the strip 120 may include a body 121, a head part 122, and a lip part 123, as illustrated in detail in FIG. 9.

First, the body 121 has a predetermined length in the front and rear directions, and an upper end of the body 121 is closely adhered to a lower end of the frame 110 at the time of coupling the strip 120 to the slit 111.

Here, the body 121 has a length that is the same as or similar to that of the slit 111, but may have various lengths, if necessary.

The head part 122 has a predetermined length in the front and rear directions at an upper end of the body 121, and a lower end of the head part 122 is caught and positioned at an upper end of the frame 110 at the time of coupling the head part 122 to the slit 111.

Here, the head part 122 and the body 121 may be connected to each other by a separate connection portion. In this case, the connection portion may be formed at the same width as that of the slit 111.

That is, in the case of sliding and coupling the head part 122 to the slit 111, the connection portion formed between the head part 122 and the body 121 may be positioned in the slit 111.

The lip part 123 has a predetermined length in the front and rear directions in a lower end of the body 121, and a lower end of the lip part 123 contacts the wind shield (not illustrated) of the vehicle.

Here, the lip part 123 may have a form in which a width thereof in the left and right directions gradually becomes small downward, as illustrated in detail in FIG. 9.

The first spoiler 130 and the second spoiler 140, which are coupled to an upper portion of the frame 110, are each coupled to upper ends of the frame 110 in the front and rear directions.

Here, the first spoiler 130 and the second spoiler 140 may have a form in which widths thereof in the left and right directions gradually become small upward.

In addition, one ends of the first spoiler 130 and the second spoiler 140 corresponding to each other are coupled to a first spoiler seating groove 240 and a second spoiler seating groove 250 of a bracket 200 to be described below, respectively.

In addition, the first spoiler 130 and the second spoiler 140 may be manufactured at a predetermined length using a material such as rubber so as to be easily elastically deformed.

In more detail, first lower catching grooves 131 are concavely formed at left and right ends of one end of the first spoiler 130 so that first upper catching protrusions 241 to be described below are correspondingly inserted thereinto.

That is, since the first lower catching grooves 131 and first upper catching protrusions 241 to be described below are coupled to each other as males and females in up and down directions, the first spoiler 130 may maintain a firm coupled state without being easily separated in the front and rear directions.

In addition, a pair of first transversal steps 132 and a first longitudinal step 133 are formed at a lower portion of the first spoiler 130, as illustrated in detail in FIG. 6.

The pair of first transversal steps 132 are horizontally bent and extended inward from both ends of the first spoiler 130 in a width direction to support the left and right ends of the frame 110.

In this case, since the first transversal steps 132 support the left and right ends of the frame 110 below the frame 110, the frame 110 does not move leftward or rightward.

The first longitudinal step 133 is horizontally bent and extended inward from one end of the first spoiler 130 in the length direction to support a front end of the frame 110.

In this case, since the first longitudinal step 133 supports the front end of the frame 110 below the frame 110, the frame 110 is positioned without being shaken in the front and rear directions.

Second lower catching grooves 141 are concavely formed at left and right ends of one end of the second spoiler 140 so that second upper catching protrusions 251 to be described below are correspondingly inserted thereinto, as illustrated in detail in FIG. 6.

In addition, lower catching protrusions 142 protruding from an upper end of the second spoiler 140 and correspondingly inserted into upper catching grooves 252 protrude upward on one end of the second spoiler 140.

That is, since the second lower catching grooves 141 and second upper catching protrusions 251 to be described below are coupled to each other as males and females in up and down directions, the second spoiler 140 may maintain a firm coupled state without being easily separated in the front and rear directions.

In addition, a pair of second transversal steps 143 and a second longitudinal step 144 are formed at a lower portion of the second spoiler 140, as illustrated in detail in FIG. 6.

The pair of second transversal steps 143 are horizontally bent and extended inward from both ends of the second spoiler 140 in the width direction.

In this case, since the second transversal steps 143 support the left and the right ends of the frame 110 below the frame 110, the frame 110 does not move leftward or rightward.

The second longitudinal step 144 is horizontally bent and extended inward from one end of the second spoiler 140 in the length direction.

In this case, since the second longitudinal step 144 supports the front end of the frame 110 below the frame 110, the frame 110 is positioned without being shaken in the front and rear directions.

Particularly, bent distal ends of the first transversal steps 132 and the second transversal steps 143 are closely adhered horizontally to left and right ends of the body 121.

In this case, since a gap is not formed between the bent distal ends of the first transversal steps 132 and the second transversal steps 143 and the body 121, air is not introduced into the inside in a process in which the vehicle is driven.

In addition, pressing protrusions 134 and 145 protrude by a predetermined length in the front and rear directions on upper surfaces of the first transversal steps 132 and the second transversal steps 143, respectively.

As illustrated in detail in FIGS. 7 and 9, upper ends of the pressing protrusions 134 and 145 are closely adhered to a lower end of the frame 110 in a state in which they press the lower end of the frame 110 upward.

Here, the upper ends of the pressing protrusions 134 and 145 form curved surfaces convex at the left and the right, and central portions of the pressing protrusions 134 and 145 may be closely adhered to the lower end of the frame 110.

In addition, one ends of the first spoiler 130 and the second spoiler 140 facing each other are horizontally opened so that both ends of the frame 110 in the front and rear directions may be slid and inserted thereinto.

That is, both ends of the frame 110 may be slid and coupled to the first spoiler 130 and the second spoiler 140 in a scheme in which they are pushed through one ends of the first spoiler 130 and the second spoiler 140.

In this case, edges of the frame 110 may be fixed without being moved by the first transversal steps 132, the second transversal steps 143, the first longitudinal step 133, and the second longitudinal step 144 described above.

The bracket 200 has the wiper blade 100 described above coupled to a lower portion thereof, and a frame seating groove 210 having a length in the front and rear directions is concavely formed in a lower surface of the bracket 200 so that the frame 110 is inserted thereinto.

Here, the frame seating groove 210 has a form in which it is opened in the front and rear directions so that both ends of the frame 110 in the front and rear directions may bidirectionally pass therethrough.

In addition, the position protrusions 220 correspondingly inserted into the cut grooves 114 described above protrude on left and right wall surfaces of the frame seating groove 210, respectively. The position protrusions 220 may be disposed at central positions of the frame seating groove 210.

In addition, support protrusions 230 protrude at a lower portion of the frame seating groove 210. The support protrusions 230 are each disposed in the front and rear directions of the frame seating groove 210 on the basis of the position protrusions 220.

Here, the support protrusions 230 protrude from the left and right wall surfaces of the frame seating groove 210, and support both ends of the frame 110 in the front and rear directions, respectively, below the frame 110.

In this case, the number of support protrusions 230 may be various, and curved surface parts 231 convex upward are formed at upper ends of the support protrusions 230.

The curved surface parts 231 are formed in the front and rear directions of the frame seating groove 210, and the centers of the curved surface parts 231 may be closely adhered to the lower end of the frame 110.

Since the curved surface parts 231 as described above form curved surfaces in a curvature direction of the frame 110, they press the lower end of the frame 110 by large force, thereby making it possible to prevent the frame 110 from being lifted by impact when the vehicle is driven at a high speed.

In addition, the first spoiler seating groove 240 and the second spoiler seating groove 250 are formed in a lower surface of the bracket 200, as illustrated in detail in FIGS. 10 to 14.

The first spoiler seating groove 240 is concavely formed in front of the frame seating groove 210 so that one end of the first spoiler 130 is correspondingly inserted thereinto.

Here, one or more first upper catching protrusions 241 protrude on left and right wall surfaces of the first spoiler seating groove 240.

The number of first upper catching protrusions 241 corresponds to that of first lower catching grooves 131 described above, and a plurality of first upper catching protrusions 241 may be arranged in front and rear directions of the first spoiler seating groove 240.

The second spoiler seating groove 250 is formed behind the frame seating groove 210 so that one end of the second spoiler 140 is correspondingly inserted thereinto.

Here, one or more second upper catching protrusions 251 protrude on left and right wall surfaces of the second spoiler seating groove 250.

The number of second upper catching protrusions 251 corresponds to that of second lower catching grooves 141 described above, and a plurality of second upper catching protrusions 251 may be arranged in front and rear directions of the second spoiler seating groove 250.

In addition, the upper catching grooves 252 are concavely formed in an upper surface of the second spoiler seating groove 250 so that the lower catching protrusions 142 described above may be correspondingly inserted thereinto as males and females.

In addition, a pair of vertical wall parts 260 vertically formed at the left and the right of the bracket 200 and a connection shaft 270 horizontally disposed to be perpendicular to upper ends of the vertical wall parts 260 are formed at an upper end of the bracket 200.

Here, the connection shaft 270 is to couple an adaptor 300 to be described below, and both ends of the connection shaft 270 in an axial direction may be rotatably and correspondingly inserted into a shaft hole 320 to be described below.

The adapter 300 is coupled to the front end of the wiper arm 10 of the vehicle in a state in which it is coupled to an upper portion of the bracket 200, as illustrated in detail in FIGS. 16 to 18.

Here, the adapter 300 has a pair of side wall parts 310 vertically formed at the left and the right thereof and an interval 311 formed between the side wall parts 310.

In addition, the upper ends of the vertical wall parts 260 described above may be inserted by a predetermined length through the interval 311 between the side wall parts 310.

In addition, the shaft hole 320 is formed in the adapter 300 so as to penetrate through the side wall parts 310 so that both ends of the connection shaft 270 in the axial direction are rotatably inserted thereinto.

The shaft hole 320 may have a circular shape so that both ends of the connection shaft 270 in the axial direction are correspondingly inserted thereinto and the connection shaft 270 may rotate in the front and rear directions.

In addition, the adapter 300 is provided with a first locking unit, a second locking unit, a third locking unit, a fourth locking unit, a fifth locking unit, and a sixth locking unit for connecting the wiper arm 10.

First, the first locking unit, which is to connect the hook connection parts 11, positions the hook connection parts 11 on the side wall parts 310 and then lock a hook 11a.

To this end, the first locking unit may include a first connection part 331 and a pair of first locking protrusions 332, as illustrated in detail in FIGS. 16 to 18.

The first connection part 331 is positioned in the interval 311 between the side wall parts 310 to connect between the side wall parts 310.

Here, the first connection part 331 is positioned at the front of the shaft hole 320, and a front surface of the first connection part 331 may be formed as a curved surface corresponding to an inner surface of the hook 11a.

The first locking protrusions 332 protrude on corresponding surfaces of the side wall parts 310 so as to be adjacent to the front of the first connection part 311, and is elastically deformable leftward and rightward.

Here, front ends of the first locking protrusions 332 are connected to the side wall parts 310, and rear ends of the first locking protrusions 332 may have a form in which edge portions thereof are cut.

In addition, inclined surfaces 332a are formed at the front ends of the first locking protrusions 332, and catching surfaces 332b having a step are formed at rear ends of the first locking protrusions 332.

The first locking protrusions 332 as described above allow the hook connection part 11 moved rearward not to move forward.

In the case in which the hook connection part 11 is positioned on the side wall parts 310 and is then moved rearward, the hook 11a is caught and positioned at the rear of the catching surfaces 332b while widening the inclined surfaces 332a of the first locking protrusions 332 outward.

As illustrated in FIGS. 23A and 23B, an inner surface of the hook 11a is seated on the front surface of the first connection part 331, and a cover 400 to be described below is rotated in a closing direction to complete connection of the hook connection part 11.

The second locking unit horizontally positions the side clip 12b of the side lock connection part 12 on the side wall parts 310 and then locks the first side pin 12a.

To this end, the second locking unit includes a coupling groove 333 formed in the connection shaft 270 and opened through the shaft hole 320.

The first side pin 12a of the side lock connection part 12 is inserted into the coupling groove 333 through the shaft hole 320 on one side surface of any one of the side wall parts 310.

Then, in the case in which the side clip 12b is horizontally rotated and positioned on the side wall parts 310, one end of the side clip 12b is caught and positioned on outer surfaces of the side wall parts 310.

In this state, as illustrated in FIGS. 25A to 25C, a cover 400 to be described below is rotated in the closing direction to complete connection of the side lock connection part 12.

The third locking unit positions the bayonet connection part 13 on the side wall parts 310 so that the first side plates 13a of the bayonet connection part 13 surround the side wall parts 310, and then locks the first side plates 13a.

To this end, the third locking unit includes an outer latch part 341 protruding from one side surface of any one of the side wall parts 310 and having a laterally extended free end elastically deformed and then horizontally returnable.

In the case in which the first side plates 13a of the bayonet connection part 13 are horizontally positioned on the side wall parts 310, the catching jaw 13b of the first side plate 13a is caught and positioned at a front end of the outer latch part 341.

In this state, as illustrated in FIGS. 27A to 27C, a cover 400 to be described below is rotated in the closing direction to complete connection of the bayonet connection part 13.

The fourth locking unit positions the side pin connection part 14 on one side surface of any one of the side wall parts 310 and then locks the second side pin 14a.

To this end, the fourth locking unit may include a notch hole 351, a second connection part 352, and an inner latch part 353.

The notch hole 351, which is positioned behind the shaft hole 320, is formed in the side wall parts 310 so as to horizontally penetrate through the side wall parts 310.

The second connection part 352, which connects between the side wall parts 310, is positioned behind the first connection part 331 so as to be spaced apart from the first connection part 331.

The inner latch part 353 is positioned so that one end thereof is connected to a rear end of the second connection part 352 and a free end thereof opposite to one end is elastically deformed upward and then horizontally returnable.

Here, a predetermined space is formed below the inner latch part 353 so that the front end of the auxiliary catching end 16e described above may be inserted thereinto.

In addition, a lower end of the inner latch part 353 is positioned at a height at which it may be caught and positioned in the groove 14b of the second side pin 14a inserted through the notch hole 351, and may have a shape corresponding to that of the groove 14b.

In the case in which the second side pin 14a of the side pin connection part 14 is horizontally inserted into the notch hole 351 on one side surface of any one of the side wall parts 310, the rear end of the inner latch part 353 ascends to a predetermined height and then descends to its original position.

In this case, the lower end of the inner latch part 353 is inserted into the groove 14b concavely formed in the outer surface of the second side pin 14a, and the second side pin 14a is not separated into an insertion direction by a catching operation of the inner latch part 353.

Then, as illustrated in FIGS. 29A to 29C, a cover 400 to be described below is rotated in the closing direction to complete connection of the side pin connection part 14.

The fifth locking unit locks the catching end 15a and the catching jaw 15c of the first top lock connection part 15, and the sixth locking unit locks the catching end 16a, the catching jaw 16c, and the auxiliary catching end 16e of the second top lock connection part 16.

To this end, the fifth locking unit and the sixth locking unit include second locking protrusions 361 protruding from the corresponding surfaces of the side wall parts 310 so as to be adjacent to the front of the first locking protrusions 332.

In addition, the fifth locking unit and the sixth locking unit include a stopper 362 protruding from one side surface of any one of the side wall parts 310 and positioned above the outer latch part 341 so as to be spaced apart from the outer latch part 341.

First, as illustrated in FIGS. 30 to 31B, in the case in which the catching jaw 15c of the first top lock connection part 15 is caught and positioned at a front end of the stopper 362 and is then positioned horizontally on the side wall parts 310, the catching end 15a formed at the front end of the first top lock connection part 15 is caught and positioned at a lower end of the second locking protrusion 361.

Then, as illustrated in FIGS. 31A and 31B, a cover 400 to be described below is rotated in the closing direction to complete connection of the first top lock connection part 15.

On the other hand, as illustrated in FIGS. 32 to 33C, in the case in which the auxiliary catching end 16e of the second top lock connection part 16 is caught and positioned at the lower end of the inner latch part 353 and the catching jaw 16c of the second top lock connection part 16 is caught and positioned at the front end of the stopper 362 and is then positioned horizontally on the side wall parts 310, the catching end 16a of the second top lock connection part 16 is caught and positioned at the lower end of the second locking protrusion 361.

The cover 400 is coupled to front ends of the side wall parts 310 so as to be rotatable forward and rearward, as illustrated in detail in FIGS. 19 to 21.

To this end, shafts for rotation may protrude on both ends of an inner side of the cover 400, and grooves to which the shafts are coupled to be rotatable forward and rearward may be formed in both ends of the side wall parts 310.

The cover 400 as described above opens upper portions of the side wall parts 310 at the time of being rotated and positioned forward, but partially closes the upper portions of the side wall parts 310 at the time of being rotated and positioned rearward.

Meanwhile, locking bars 380 for maintaining a closed position of the cover 400 are formed on outer surfaces of the side wall parts 310, respectively.

The locking bars 380 protrude laterally of the side wall parts 310 and are then bent and extended forward, and distal ends of the locking bars 380 bent forward are formed to be elastically deformable leftward and rightward.

In addition, locking grooves 410 are concavely formed at left and right ends of the cover 400, respectively, so that the locking bars 380 may be coupled thereto while surrounding left and right surfaces of the cover 400 in the case of closing the cover 400.

Here, the locking groove 410 has a shape corresponding to that of the locking bar 380, and in the case in which the locking bar 380 is coupled to the locking groove 410, the cover 400 is maintained in a closed state without being rotated.

In addition, inclined surfaces 420 for expanding the locking bars 380 leftward and rightward and then inserting the locking bars 380 into the locking grooves 410 in the case of closing the cover 400 are formed below the locking grooves 410.

Since the inclined surfaces 420 have a form in which widths thereof in the left and right directions gradually become large upward, the locking bars 380 may be inserted into the locking grooves 410 while being expanded leftward and rightward.

In addition, pushing parts 430 cut to be returnable by elastic force after a push operation may be formed on the left and right surfaces of the cover 400, respectively.

In this case, cut parts 440 may be formed at edges except for portions of the pushing parts 430 so that leftward and rightward elastic deformation is possible.

Here, a plurality of protrusions, grooves, or the like, capable of preventing sliding may be formed on outer surfaces of the pushing parts 430.

Since the pushing parts 430 as described above are deformed inward of the cover 400 at the time of a pushing operation, they may separate the locking bars 380 from the locking grooves 410.

On the other hand, since the pushing parts 430 return to their original forms at the time of releasing the pushing operation of the pushing part 430, they may maintain a coupled state between the locking grooves 410 and the locking bars 380.

As a result, in the present disclosure, several types of wiper arms 10 are selectively connected using one adapter 300, thereby making it possible to secure diversity and convenience of the use.

In addition, in the present disclosure, the frame 110 of the wiper blade 100, and the bracket 200 and the first and second spoilers 130 and 140 are coupled to each other using a fitting coupling structure and a slide coupling structure, such that a structure may be simplified, thereby making it possible to reduce a manufacturing cost, and a coupled state between the frame 110 and the bracket 200 is not changed (a lift phenomenon, or the like, does not occur) even when the vehicle is driven at a high speed, such that reliability of the device may be improved.

Further, in the present disclosure, the first and second spoilers 130 and 140 and the frame 110 are slid and coupled to each other in a direction perpendicular to an operation direction of the wiper blade 100, such that an assembling process is easily performed, thereby making it possible to improve productivity.

Furthermore, in the present disclosure, the gap is not formed at coupled portions between the first and second spoilers 130 and 140 and the strip 120, such that a flow of air may be smoothly maintained, thereby making it possible to prevent the wiper blade 100 from being floated by the flow of air.

Although the device for connecting a wiper blade to a wiper arm according to a specific exemplary embodiment of the present disclosure has been described hereinabove, it is obvious that several modifications may be made without departing from the scope of the present disclosure.

In the present disclosure, several types of wiper arms depending on manufacturers are selectively connected using one adapter, thereby making it possible to secure diversity and convenience of the use.

In addition, in the present disclosure, a frame of the wiper blade, and a bracket and spoilers are coupled to each other using a fitting coupling structure and a slide coupling structure, such that a structure may be simplified, thereby making it possible to reduce a manufacturing cost, and a coupled state between the frame and the bracket is not changed even when a vehicle is driven at a high speed, such that reliability of the device may be improved.

Further, in the present disclosure, spoilers and a frame are slid and coupled to each other in a direction perpendicular to an operation direction of the wiper blade, such that an assembling process is easily performed, thereby making it possible to improve productivity.

Furthermore, in the present disclosure, a gap is not formed at coupled portions between spoilers and strip, such that a flow of air may be smoothly maintained, thereby making it possible to prevent the wiper blade from being floated.

Accordingly, the scope of the present disclosure is not construed as being limited to the exemplary embodiments described above, but is to be defined by the claims as well as equivalents thereto.

That is, it is to be understood that the exemplary embodiment described above is not restrictive, but is illustrative in all aspects, the scope of the present disclosure is defined by the claims to be provided below rather than the detailed description, and it is to be understood that all the modifications or alterations deriving from the meaning and the scope of the claims and equivalents thereto fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A device for connecting a wiper blade to a wiper arm, comprising:
    a bracket having the wiper blade coupled to a lower portion thereof, the wiper blade having a length in front and rear directions; and
    an adapter coupled to an upper portion of the bracket to be thus coupled to the wiper arm,
    wherein the wiper blade includes a frame having a slit formed in the front and rear directions so as to vertically penetrate therethrough and cut grooves each formed at left and right ends thereof, a strip coupled through a lower portion of the slit, and a first spoiler and a second spoiler coupled to an upper portion of the frame and each coupled to upper ends of the frame in the front and rear directions,
    the bracket includes a frame seating groove concavely formed in a lower surface of the bracket so that the frame is inserted thereinto and having a length in the front and rear directions, a first spoiler seating groove concavely formed in front of the frame seating groove so that one end of the first spoiler is inserted thereinto and having first upper catching protrusions protruding on left and right wall surfaces thereof, and a second spoiler seating groove concavely formed behind the frame seating groove so that one end of the second spoiler is inserted thereinto and having second upper catching protrusions protruding on left and right wall surfaces thereof, and
    first lower catching grooves are concavely formed at left and right ends of one end of the first spoiler so that the first upper catching protrusions are correspondingly inserted thereinto, the first lower catching grooves and the first upper catching protrusions are adjacent to the left and right ends of the frame and the frame is positioned between the first lower catching grooves and the strip, and second lower catching grooves are concavely formed at left and right ends of one end of the second spoiler so that the second upper catching protrusions are correspondingly inserted thereinto, the second lower catching groves and the second upper catching protrusions are adjacent to the left and right ends of the frame and the frame is positioned between the strip and the second lower catching grooves.

2. The device for connecting a wiper blade to a wiper arm of claim 1, wherein left and right wall surfaces of the frame seating groove include:
    position protrusions correspondingly inserted in to the cut grooves, and
    support protrusions each disposed in the front and rear directions of the frame seating groove on the basis of the position protrusions and supporting both ends of the frame in the front and rear directions, respectively, below the frame.

3. The device for connecting a wiper blade to a wiper arm of claim 2, wherein curved surface parts convex upward are formed at upper ends of the support protrusions, and
    the curved surface parts are formed in the front and rear directions of the frame seating groove and are closely adhered to a lower end of the frame.

4. The device for connecting a wiper blade to a wiper arm of claim 2, wherein the frame has a shape bent downward along both ends in the front and rear directions on the basis of the cut grooves, and
    a linear part of which both ends in the front and rear directions are supported on upper ends of the support protrusions and an upper end is closely adhered to and horizontally disposed on an upper surface of the frame seating groove is formed at the center of the frame.

5. The device for connecting a wiper blade to a wiper arm of claim 1, wherein the strip includes:
   a body having a length in the front and rear directions and having an upper end closely adhered to a lower surface of the frame,
   a head part having a length in the front and rear directions at the upper end of the body and inserted through the slit to have a lower end closely adhered to the upper end of the frame, and
   a lip part having a length in the front and rear directions in a lower end of the body and having a lower end protruding downward of the first spoiler and the second spoiler.

6. The device for connecting a wiper blade to a wiper arm of claim 5, wherein an insertion hole for inserting one end of the head part through a lower portion thereof and then sliding and coupling the head part in an opposite direction is formed in any one of the front and rear directions of the slit, and
   a pair of guide parts for guiding the head part to the slit are correspondingly formed at left and right ends of the insertion hole, the guide parts having a width therebetween gradually becoming small toward the slit.

7. The device for connecting a wiper blade to a wiper arm of claim 1, wherein upper catching grooves are concavely formed in an upper surface of the second spoiler seating groove, and
   lower catching protrusions protruding from an upper end of the second spoiler and correspondingly inserted into the upper catching grooves are formed at one end of the second spoiler.

8. The device for connecting a wiper blade to a wiper arm of claim 1, wherein a pair of first transversal steps horizontally bent inward from both ends of the first spoiler in a width direction to support left and the right ends of the frame below the frame, and a first longitudinal step horizontally bent inward from one end of the first spoiler in a length direction to support a front end of the frame below the frame are formed at a lower portion of the first spoiler, and
   a pair of second transversal steps horizontally bent inward from both ends of the second spoiler in the width direction to support the left and the right ends of the frame below the frame, and a second longitudinal step horizontally bent inward from one end of the second spoiler in the length direction to support a rear end of the frame below the frame are formed at a lower portion of the second spoiler.

9. The device for connecting a wiper blade to a wiper arm of claim 8, wherein bent distal ends of the first transversal steps and the second transversal steps are closely adhered horizontally to left and right ends of a body of the strip.

10. The device for connecting a wiper blade to a wiper arm of claim 8, wherein one ends of the first spoiler and the second spoiler facing each other are horizontally opened so that both ends of the frame in the front and rear directions are slid and inserted thereinto.

11. The device for connecting a wiper blade to a wiper arm of claim 8, wherein pressing protrusions protrude in the front and rear directions on upper surfaces of the first transversal steps and the second transversal steps, respectively, and
   upper ends of the pressing protrusions press a lower end of the frame upward.

12. The device for connecting a wiper blade to a wiper arm of claim 1, wherein a pair of vertical wall parts vertically formed at the left and the right of the bracket and a connection shaft horizontally disposed to be perpendicular to upper ends of the vertical wall parts are formed at an upper end of the bracket, and
   the adapter has a pair of side wall parts vertically formed at the left and the right thereof and inserted between the vertical wall parts, and the pair of side wall parts have a shaft hole formed therein so as to penetrate through the side wall parts so that both ends of the connection shaft in an axial direction are rotatably inserted thereinto.

13. The device for connecting a wiper blade to a wiper arm of claim 12, wherein any one of a hook connection part having a hook of a front end bent downward and rearward, a side lock connection part having a first side pin and a side clip each protruding on one side surface thereof, a bayonet connection part having a pair of first side plates formed at left and right lower ends thereof and a catching jaw formed at the rear of the first side plates, a side pin connection part having a second side pin protruding on one side surface thereof, a first top lock connection part having a catching end formed at a front end thereof, a pair of second side plates formed at left and right lower ends thereof, and a catching jaw formed at the rear of the second side plates, and a second top lock connection part having a catching end formed at a front end thereof, a pair of third side plates formed at left and right lower ends thereof, and a catching jaw formed at the rear of the third side plates, and having an auxiliary catching end downward bent and extended from an inner peripheral surface of an opening part formed at an upper end thereof toward the front is formed at a front end of the wiper arm, and
   a first locking unit positioning the hook connection part on the side wall parts and then locking the hook, a second locking unit horizontally positioning the side clip on the side wall parts and then locking the first side pin, a third locking unit positioning the bayonet connection part on the side wall parts so that the first side plates surround the side wall parts, and then locking the first side plates, a fourth locking unit positioning the side pin connection part on one side surface of any one of the side wall parts and then locking the second side pin, a fifth locking unit locking the catching end and the catching jaw of the first top lock connection part, and the sixth locking unit locking the catching end, the catching jaw, and the auxiliary catching end of the second top lock connection part are formed at the adapter.

14. The device for connecting a wiper blade to a wiper arm of claim 13, wherein the first locking unit includes a first connection part connecting between the side wall parts and positioned at the front of the shaft hole and a pair of first locking protrusions protruding on corresponding surfaces of the side wall parts so as to be adjacent to the front of the first connection part, elastically deformable leftward and rightward, and having inclined surfaces formed at front ends thereof and catching surfaces formed at rear ends thereof, and
   in the case in which the hook connection part is positioned on the side wall parts and is then moved rearward, the hook is positioned at the rear of the catching surfaces while widening the inclined surfaces outward, and an inner surface of the hook is seated on a front surface of the first connection part.

15. The device for connecting a wiper blade to a wiper arm of claim 14, wherein the fifth locking unit and the sixth locking unit include second locking protrusions protruding from the corresponding surfaces of the side wall parts so as to be adjacent to the front of the first locking protrusions and a stopper protruding from one side surface of any one of the side wall parts and positioned above the outer latch part so as to be spaced apart from the outer latch part, in the case in which the catching jaw of the first top lock connection part is caught and positioned at a front end of the stopper and is then positioned horizontally on the side wall parts, the catching end is caught and positioned at a lower end of the second locking protrusion and the catching jaw is caught and positioned at the front end of the stopper, and in the case in which the auxiliary catching end of the second top lock connection part is caught and positioned at a lower end of the inner latch part and the catching jaw of the second top lock connection part is caught and positioned at the front end of the stopper and is then positioned horizontally on the side wall parts, the catching end is caught and positioned at the lower end of the second locking protrusion.

16. The device for connecting a wiper blade to a wiper arm of claim 13, wherein the second locking unit includes a coupling groove formed in the connection shaft and opened through the shaft hole, and in the case in which the first side pin of the side lock connection part is inserted into the coupling groove through the shaft hole on one side surface of any one of the side wall parts and the side clip of the side lock connection part is then horizontally rotated and positioned on the side wall parts, one end of the side clip is caught and positioned on outer surfaces of the side wall parts.

17. The device for connecting a wiper blade to a wiper arm of claim 13, wherein the third locking unit includes an outer latch part protruding from one side surface of any one of the side wall parts and having a laterally extended free end elastically deformed and then horizontally returnable, and in the case in which the first side plates of the bayonet connection part are horizontally positioned on the side wall parts, the catching jaw of the first side plate is caught and positioned at a front end of the outer latch part.

18. The device for connecting a wiper blade to a wiper arm of claim 13, wherein the fourth locking unit includes a notch hole positioned behind the shaft hole and formed in the side wall parts so as to penetrate through the side wall parts, a second connection part connecting between the side wall parts and positioned behind the first connection part so as to be spaced apart from the first connection part, and an inner latch part extended rearward from the second connection part and having a rearward extended free end elastically deformed upward and then horizontally returnable, and in the case in which the second side pin of the side pin connection part is horizontally inserted into the notch hole on one side surface of any one of the side wall parts, the inner latch part ascends and then descends to its original position to be thus caught and positioned on an outer surface of the second side pin.

19. The device for connecting a wiper blade to a wiper arm of claim 12, wherein a cover is coupled to front ends of the side wall parts so as to be rotatable forward and rearward, and the cover opens upper portions of the side wall parts at the time of being rotated forward and closes the upper portions of the side wall parts at the time of being rotated rearward.

20. The device for connecting a wiper blade to a wiper arm of claim 19, wherein locking bars protruding laterally and then bent and extended forward and elastically deformable leftward and rightward are further formed on outer surfaces of the side wall parts, respectively, and locking grooves are formed at left and right ends of the cover, respectively, so that the locking bars are correspondingly inserted thereinto while surrounding left and right surfaces of the cover in the case of closing the cover.

21. The device for connecting a wiper blade to a wiper arm of claim 20, wherein inclined surfaces for expanding the locking bars leftward and rightward and then inserting the locking bars into the locking grooves in the case of closing the cover are formed below the locking grooves.

22. The device for connecting a wiper blade to a wiper arm of claim 21, wherein pushing parts cut to be returnable after a push operation are formed on the left and right surfaces of the cover, respectively, and at the time of a pushing operation of the pushing parts, the locking bars are separated from the locking grooves.

\* \* \* \* \*